(12) United States Patent
Inoue

(10) Patent No.: US 11,830,343 B2
(45) Date of Patent: Nov. 28, 2023

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventor: Haruki Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 17/523,108

(22) Filed: Nov. 10, 2021

(65) Prior Publication Data
US 2022/0198909 A1 Jun. 23, 2022

(30) Foreign Application Priority Data
Dec. 22, 2020 (JP) .................. 2020-213009

(51) Int. Cl.
*G08B 21/24* (2006.01)
*G08B 3/10* (2006.01)
(Continued)

(52) U.S. Cl.
CPC ......... *G08B 21/24* (2013.01); *B60H 1/00742* (2013.01); *G06V 20/593* (2022.01); *G06V 40/174* (2022.01); *G08B 3/10* (2013.01)

(58) Field of Classification Search
CPC ........ G08B 21/24; G08B 21/00; G08B 21/02; G08B 21/22; G08B 3/10; B60R 2300/8013; B60H 1/00742; B60H 1/00778; B60H 1/00978; B60H 1/00985; B60H 1/00735; B60H 1/00785; G06V 20/593; G06V 40/174; B60K 2370/176; B60K 2370/739; B60K 2370/741; B60K 35/00; B60Q 5/00
See application file for complete search history.

(56) References Cited

U.S. PATENT DOCUMENTS

| 2015/0379362 A1* | 12/2015 | Calmes ................ G06T 7/20 348/136 |
| 2019/0329790 A1 | 10/2019 | Nandakumar |
| 2020/0285870 A1* | 9/2020 | Yi ..................... B60W 50/14 |

FOREIGN PATENT DOCUMENTS

| CN | 108334871 A | 7/2018 |
| CN | 109003425 A | 12/2018 |
| JP | 2020-149489 A | 9/2020 |

\* cited by examiner

*Primary Examiner* — Brian Wilson
(74) *Attorney, Agent, or Firm* — Sughrue Mion, PLLC

(57) ABSTRACT

A control apparatus includes a living body presence/absence determination unit configured to determine whether a predetermined living body is left in a vehicle cabin, a cabin camera configured to acquire image data containing a face of the predetermined living body left in the cabin, a facial expression analysis information acquisition unit configured to acquire information on facial expression of the predetermined living body based on the image data, a determination unit configured to determine whether a safety of a life of the predetermined living body is a predetermined reference or lower based on the information on the facial expression, and a control unit configured to, when the determination unit determines that the safety of the life of the predetermined (Continued)

living body is the predetermined reference or lower, activate a safety function for ensuring the safety of the life of the predetermined living body.

8 Claims, 12 Drawing Sheets

(51) Int. Cl.
*B60H 1/00* (2006.01)
*G06V 20/59* (2022.01)
*G06V 40/16* (2022.01)

FIG. 4

| CABIN ENVIRONMENT INDEX W | |
|---|---|
| WBGT < 25°C | W1 |
| 25°C ≤ WBGT < 28°C | W2 |
| 28°C ≤ WBGT < 31°C | W3 |
| 31°C ≤ WBGT | |

| FACIAL EXPRESSION ANALYSIS INDEX F (= FE + FS + FA) | | | | | | |
|---|---|---|---|---|---|---|
| EMOTION INDEX FE | | | FACE STATE INDEX FS | | AGE INDEX FA | |
| POSITIVE EMOTION | | FE0 | POSITIVE / NEUTRAL | FS0 | JUNIOR HIGH SCHOOL STUDENTS OR OVER (EXCEPT ELDERLY PEOPLE) | FA0 |
| | SURPRISED | FE1 | NEGATIVE | FS1 | ELEMENTARY SCHOOL STUDENTS | FA1 |
| NEGATIVE EMOTION | SAD | FE2 | CRYING | FS2 | ELDERLY PEOPLE | FA2 |
| | ANGRY | FE3 | KEEPING EYES CLOSED | | INFANT CHILDREN | FA3 |
| | | | | | NEWBORN CHILDREN | FA4 |
| ( 0 < FE0 < FE1 < FE2 < FE3 ) | | | ( 0 < FS0 < FS1 < FS2 ) | | ( 0 < FA0 < FA1 < FA2 < FA3 < FA4 ) | |

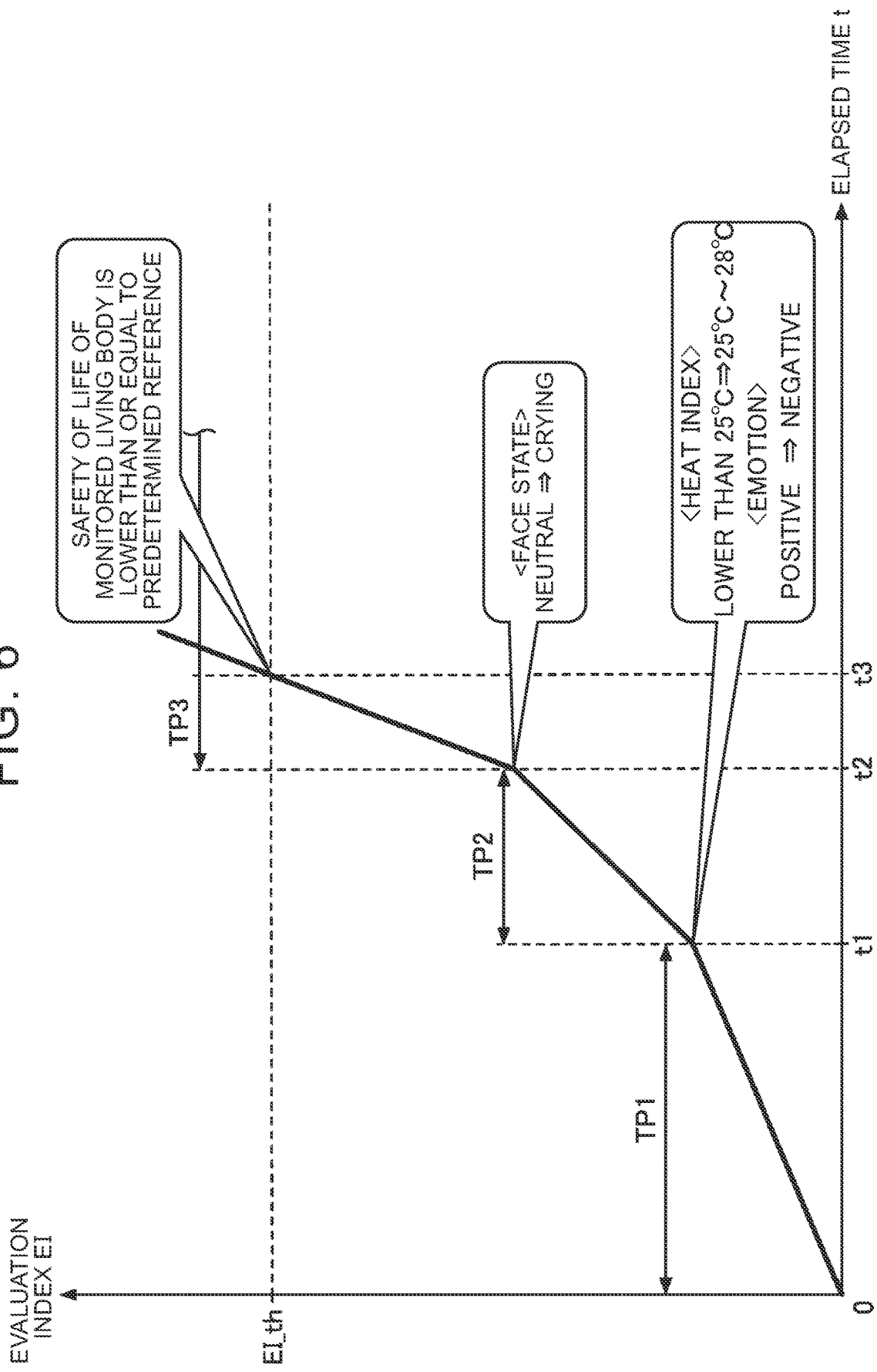

INFORMATION PROCESSING APPARATUS, INFORMATION PROCESSING METHOD, AND NON-TRANSITORY STORAGE MEDIUM

CROSS-REFERENCE TO RELATED APPLICATION

This application claims priority to Japanese Patent Application No. 2020-213009 filed on Dec. 22, 2020, incorporated herein by reference in its entirety.

BACKGROUND

1. Technical Field

The disclosure relates to an information processing apparatus, an information processing method, and a non-transitory storage medium.

2. Description of Related Art

Hitherto, there has been known a technique for detecting a living body, such as a person and a pet animal, left in a cabin of a vehicle and ensuring the safety of the life of the living body (see, for example, Japanese Unexamined Patent Application Publication No. 2020-149489 (JP 2020-149489 A)).

In JP 2020-149489 A, a decrease in the safety of the life of a living body is determined in accordance with a temperature in the cabin of a vehicle, an elapsed time after the vehicle is locked, or the like, and a warning alarm is output. Thus, the safety of the life of the living body is ensured.

SUMMARY

However, there are individual differences among living bodies. For this reason, even when a temperature in the cabin of a vehicle, an elapsed time after the vehicle is locked, or the like falls within a reference range, the safety of the life of a specific living body left in the cabin of the vehicle may not be ensured.

The disclosure provides a technique for making it possible to ensure the safety of the life of a living body left in a vehicle in consideration of an individual difference of the living body.

An aspect of the disclosure relates to an information processing apparatus. The information processing apparatus includes a first determination unit configured to determine whether a predetermined living body is left in a cabin of a vehicle, a facial expression information acquisition unit configured to acquire information on facial expression of a face of the predetermined living body based on image data containing the face of the predetermined living body left in the cabin of the vehicle, a second determination unit configured to determine whether a safety of a life of the predetermined living body is lower than or equal to a predetermined reference based on the information on the facial expression of the predetermined living body, and a control unit configured to, when the second determination unit determines that the safety of the life of the predetermined living body is lower than or equal to the predetermined reference, activate a safety function for ensuring the safety of the life of the predetermined living body.

According to the above aspect, the information processing apparatus is able to use information on facial expression of a face of a predetermined living body left in the cabin of the vehicle. Therefore, the information processing apparatus is able to grasp a state or the like specific to the predetermined living body based on the facial expression of the face of the predetermined living body and determine a degree of decrease in the safety of the life of the predetermined living body. Thus, the information processing apparatus is able to ensure the safety of the life of the predetermined living body left in the vehicle in consideration of an individual difference of the predetermined living body.

In the above aspect, the information processing apparatus may further include an estimation unit configured to estimate a degree of decrease in the safety of the life of the predetermined living body based on information on the facial expression of the predetermined living body, acquired by the facial expression information acquisition unit, and the second determination unit may be configured to determine whether the safety of the life of the predetermined living body is lower than or equal to the predetermined reference in accordance with an estimated result of the estimation unit.

According to the above aspect, the information processing apparatus is able to estimate a degree of decrease in the safety of the life of a predetermined living body in consideration of an individual difference of the predetermined living body by using information on facial expression of a face of the predetermined living body left in the cabin of the vehicle. Therefore, when the information processing apparatus determines whether the safety of the life of the predetermined living body is lower than or equal to the predetermined reference by using the estimated result, the information processing apparatus is able to ensure the safety of the life of the living body left in the vehicle, specifically, in consideration of an individual difference of the predetermined living body.

In the above aspect, the information on the facial expression of the predetermined living body may include information on emotion of the predetermined living body, and the estimation unit may be configured to estimate a degree of decrease in the safety of the life of the predetermined living body such that a degree of decrease in the safety of the life of the predetermined living body when the information on the emotion of the predetermined living body represents a negative emotion is greater than a degree of decrease in the safety of the life of the predetermined living body when the information on the emotion of the predetermined living body represents a positive emotion or a neutral emotion.

According to the above aspect, the information processing apparatus is able to estimate a degree of decrease in the safety of the life of a predetermined living body left in the vehicle, specifically, in consideration of an individual difference of the predetermined living body by capturing the emotion of the predetermined living body.

In the above aspect, the information on the facial expression of the predetermined living body may include information on a face state of the predetermined living body, and the estimation unit may be configured to estimate a degree of decrease in the safety of the life of the predetermined living body such that a degree of decrease in the safety of the life of the predetermined living body when the information on the face state of the predetermined living body represents a negative face state is greater than a degree of decrease in the safety of the life of the predetermined living body when the information on the face state of the predetermined living body represents a positive face state or neutral face state of the predetermined living body.

According to the above aspect, the information processing apparatus is able to estimate a degree of decrease in the safety of the life of a predetermined living body left in the vehicle, specifically, in consideration of an individual difference of the predetermined living body by capturing the face state of the predetermined living body.

In the above aspect, the estimation unit may be configured to estimate a degree of decrease in the safety of the life of the predetermined living body such that a decrease in the safety of the life of the predetermined living body accelerates as the information on the emotion of the predetermined living body changes from a state representing the positive emotion or the neutral emotion to a state representing the negative emotion or as the information on the face state of the predetermined living body changes from a state representing the positive face state or the neutral face state to a state representing the negative face state.

According to the above aspect, the information processing apparatus is able to estimate a degree of decrease in the safety of the life of a predetermined living body by capturing a situation in which a decrease in the safety of the life of the predetermined living body is accelerating with a negative change of the emotion or face state of the predetermined living body. Therefore, the information processing apparatus is able to estimate a degree of decrease in the safety of the life of a predetermined living body, specifically, in consideration of an individual difference of the predetermined living body by capturing a negative change of the emotion or face state of the predetermined living body.

In the above aspect, the estimation unit may be configured to estimate a degree of decrease in the safety of the life of the predetermined living body such that the safety of the life of the predetermined living body decreases with a lapse of time for which the predetermined living body has been left in the cabin of the vehicle, and the estimation unit may be configured to estimate a degree of decrease in the safety of the life of the predetermined living body such that a rate of decrease in the safety of the life of the predetermined living body to the lapse of time when the information on the emotion of the predetermined living body represents the negative emotion is higher than a rate of decrease in the safety of the life of the predetermined living body to the lapse of time when the information on the emotion of the predetermined living body represents the positive emotion or the neutral emotion and a rate of decrease in the safety of the life of the predetermined living body to the lapse of time when the information on the face state of the predetermined living body represents the negative face state is higher than a rate of decrease in the safety of the life of the predetermined living body to the lapse of time when the information on the face state of the predetermined living body represents the positive face state or the neutral face state.

According to the above aspect, the information processing apparatus is able to variably change a rate of decrease in the safety of the life of a predetermined living body depending on a difference in the emotion or face state of the predetermined living body on the assumption that the safety of the life of the predetermined living body decreases with a lapse of time for which the predetermined living body has been left in the cabin of the vehicle. Therefore, the information processing apparatus is able to estimate a degree of decrease in the safety of the life of a predetermined living body, specifically, such that a decrease in the safety of the life of the predetermined living body accelerates with a negative change of the emotion or face state of the predetermined living body.

In the above aspect, the information on the facial expression of the predetermined living body may include information on emotion of the predetermined living body, and the estimation unit may be configured to estimate a degree of decrease in the safety of the life of the predetermined living body such that, when the information on the emotion of the predetermined living body represents any one of multiple types of negative emotions defined in advance, a degree of decrease in the safety of the life of the predetermined living body varies depending on the represented one of the types of negative emotions.

According to the above aspect, the information processing apparatus is able to further appropriately estimate a degree of decrease in the safety of the life of a predetermined living body even when a physical condition or the like of the predetermined living body, expressed by the emotion, can vary depending on the type of a negative emotion.

In the above aspect, the information on the facial expression of the predetermined living body may include information on age of the predetermined living body, and the estimation unit may be configured to estimate a degree of decrease in the safety of the life of the predetermined living body such that a degree of decrease in the safety of the life of the predetermined living body varies depending on the age of the predetermined living body.

According to the above aspect, the information processing apparatus is able to further appropriately estimate a degree of decrease in the safety of the life of a predetermined living body even when a characteristic, such as physical fitness, can vary depending on the age of the predetermined living body.

In the above aspect, the safety function for ensuring the safety of the life of the predetermined living body may include at least one of a function of issuing an alarm about the predetermined living body left behind to around the vehicle through a sound output device mounted on the vehicle, a function of providing a notification about the predetermined living body left behind to a terminal device used by a user of the vehicle, a function of providing a notification about the predetermined living body left behind to a predetermined facility provided outside the vehicle, and a function of activating an air conditioner of the vehicle.

According to the above aspect, the information processing apparatus is able to specifically ensure the safety of the life of a predetermined living body.

Another aspect of the disclosure may be implemented as an information processing method or a non-transitory storage medium.

According to the above aspects, it is possible to ensure the safety of the life of a living body left in a vehicle in consideration of an individual difference of the living body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table illustrating an example of a method of choosing an evaluation index;

FIG. 5 is a table illustrating an example of a method of choosing an evaluation index;

FIG. 6 is a graph showing a specific example of a time-sequence change of the evaluation index;

DETAILED DESCRIPTION OF EMBODIMENTS

Hereinafter, an embodiment will be described with reference to the accompanying drawings.
First Example of Living Body Left-behind Monitoring System A first example of a living body left-behind monitoring system according to the present embodiment will be described with reference to FIG. 1 to FIG. 7.
Outline of Living Body Left-behind Monitoring System FIG. 1 is a schematic diagram showing the first example of the living body left-behind monitoring system 1.

The living body left-behind monitoring system 1 monitors a degree of decrease in the safety of the life of a predetermined living body to be monitored (hereinafter, monitored living body), left in a cabin of a vehicle 100. When the safety of the life of the monitored living body left in the cabin of the vehicle 100 is lower than or equal to a predetermined reference, the living body left-behind monitoring system 1 activates a function for ensuring the safety of the life of the monitored living body (hereinafter, safety function). The details of the safety function will be described later.

Examples of the monitored living body include a human. Examples of the monitored living body also include a pet animal.

Figure 1:
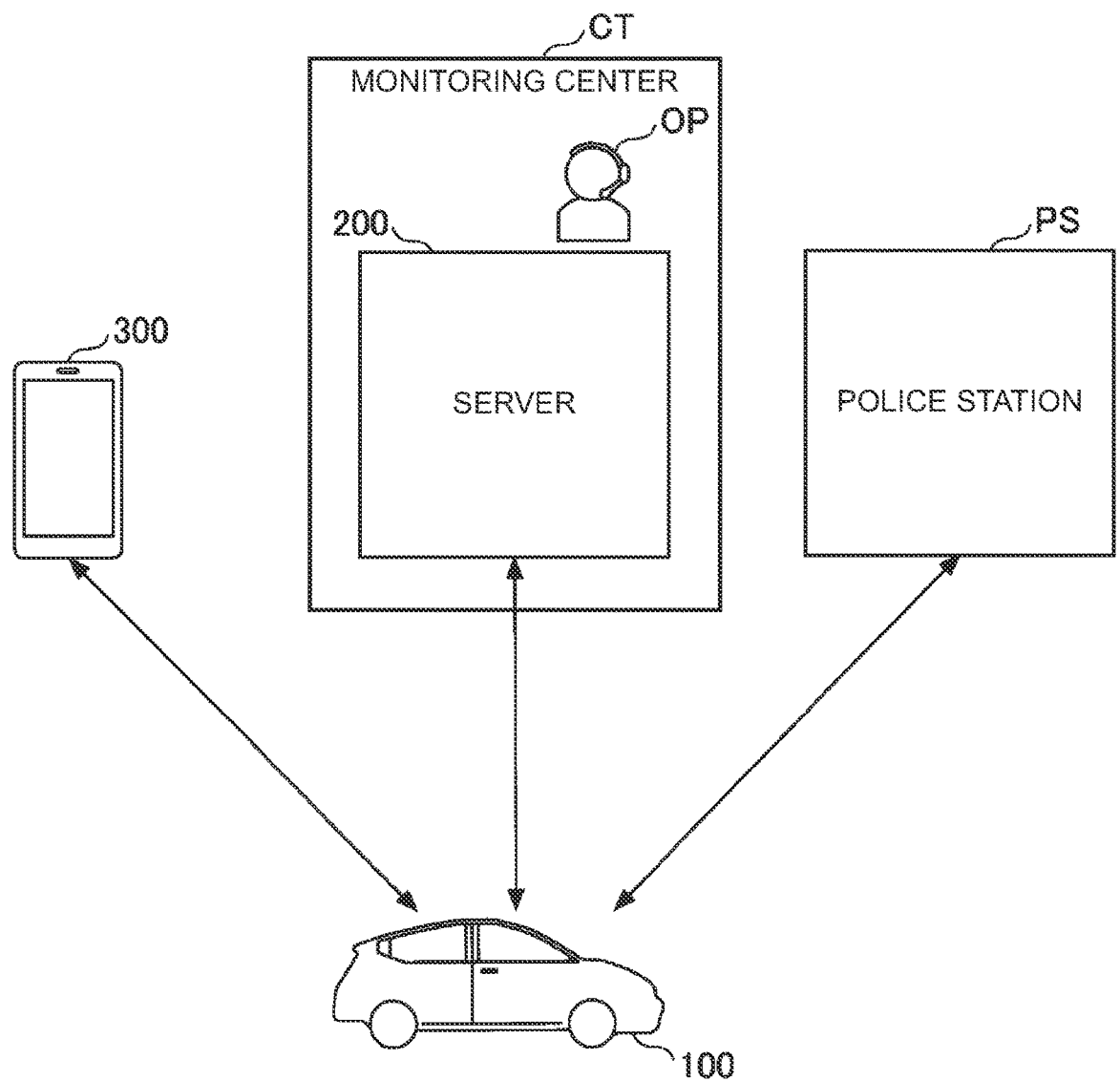
FIG. 1 is a schematic diagram showing a first example of a living body left-behind monitoring system.

As shown in FIG. 1, the living body left-behind monitoring system 1 includes the vehicle 100, a server 200, and a user terminal 300.

The number of the vehicles 100 included in the living body left-behind monitoring system 1 may be one or may be multiple. In other words, the living body left-behind monitoring system 1 may monitor a degree of decrease in the safety of the life of a monitored living body left in each of the vehicles 100.

The vehicle 100 has a function of determining whether a predetermined monitored living body is left in the cabin and, when there is a monitored living body, monitoring a degree of decrease in the safety of the life of the monitored living body. When the safety of the life of the monitored living body left in the cabin is lower than or equal to the predetermined reference, the vehicle 100 activates the safety function.

The vehicle 100 is equipped with a communication device 50 (described later) and is connected to an external device (for example, the server 200, the user terminal 300, a communication system of a police station PS, or the like) through a predetermined communication line so as to be able to communicate with the external device. With this configuration, the vehicle 100 is able to transmit a signal including information on a monitored living body left behind to the server 200 or the user terminal 300 or to provide a notification about a monitored living body left behind to a police station PS as will be described later.

Examples of the predetermined communication line include a mobile communication network with a base station as a terminal, a satellite communication network using a communication satellite, and a wide area network (WAN), such as the Internet network. Examples of the predetermined communication line may include a local area network (LAN). Examples of the predetermined communication line may include a near-field communication line based on a wireless communication standard, such as Wi-Fi and Bluetooth (registered trademark).

The server 200 is installed in, for example, a monitoring center CT that monitors the state and the like of the vehicle 100. The server 200 is connected to the vehicle 100 through the predetermined communication line so as to be able to communicate with the vehicle 100.

The server 200 functions as, for example, an interface between an operator OP stationed in the monitoring center CT and the vehicle 100 or an occupant of the vehicle 100. With this configuration, the operator OP is able to talk to the occupant of the vehicle 100 on the phone or to check information included in a signal transmitted from the vehicle 100 through voice or screen.

The user terminal 300 is a terminal device used (owned) by a user of the vehicle 100. Examples of the user of the vehicle 100 include an owner of the vehicle 100 and a family of the owner of the vehicle 100. Examples of the user terminal 300 include a mobile (portable) terminal device, such as a smartphone, a tablet terminal, and a laptop computer terminal. Examples of the user terminal 300 include a stationary terminal device, such as a desktop computer terminal.

The user terminal 300 is connected to the vehicle 100 through the predetermined communication line so as to be able to communicate with the vehicle 100. With this configuration, the user terminal 300 is able to receive a signal transmitted from the vehicle 100 and to cause a user (the user of the vehicle 100) to grasp information included in the signal through a display, a speaker, or the like.

Figure 2:
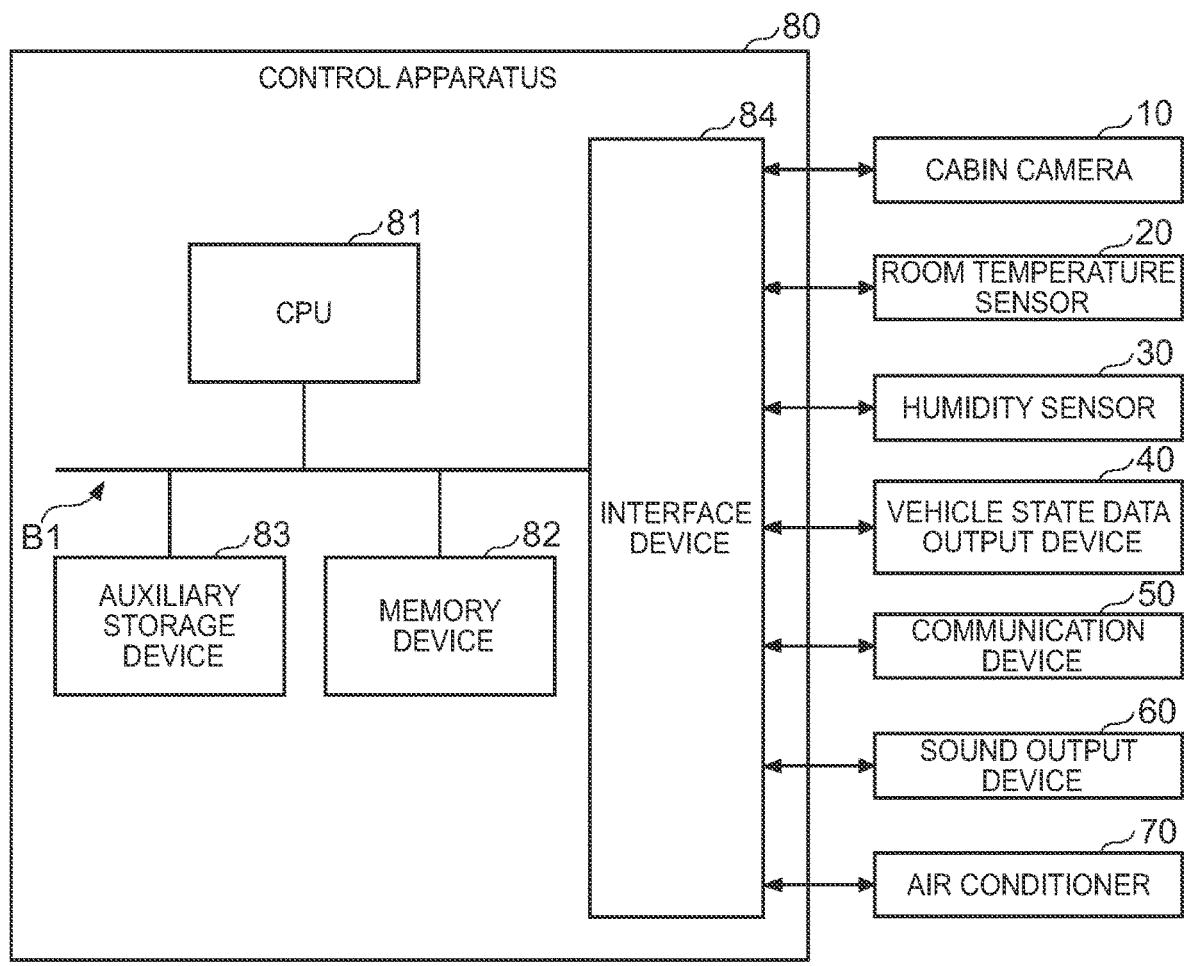
FIG. 2 is a diagram showing an example of the hardware configuration of a vehicle.
Figure 3:
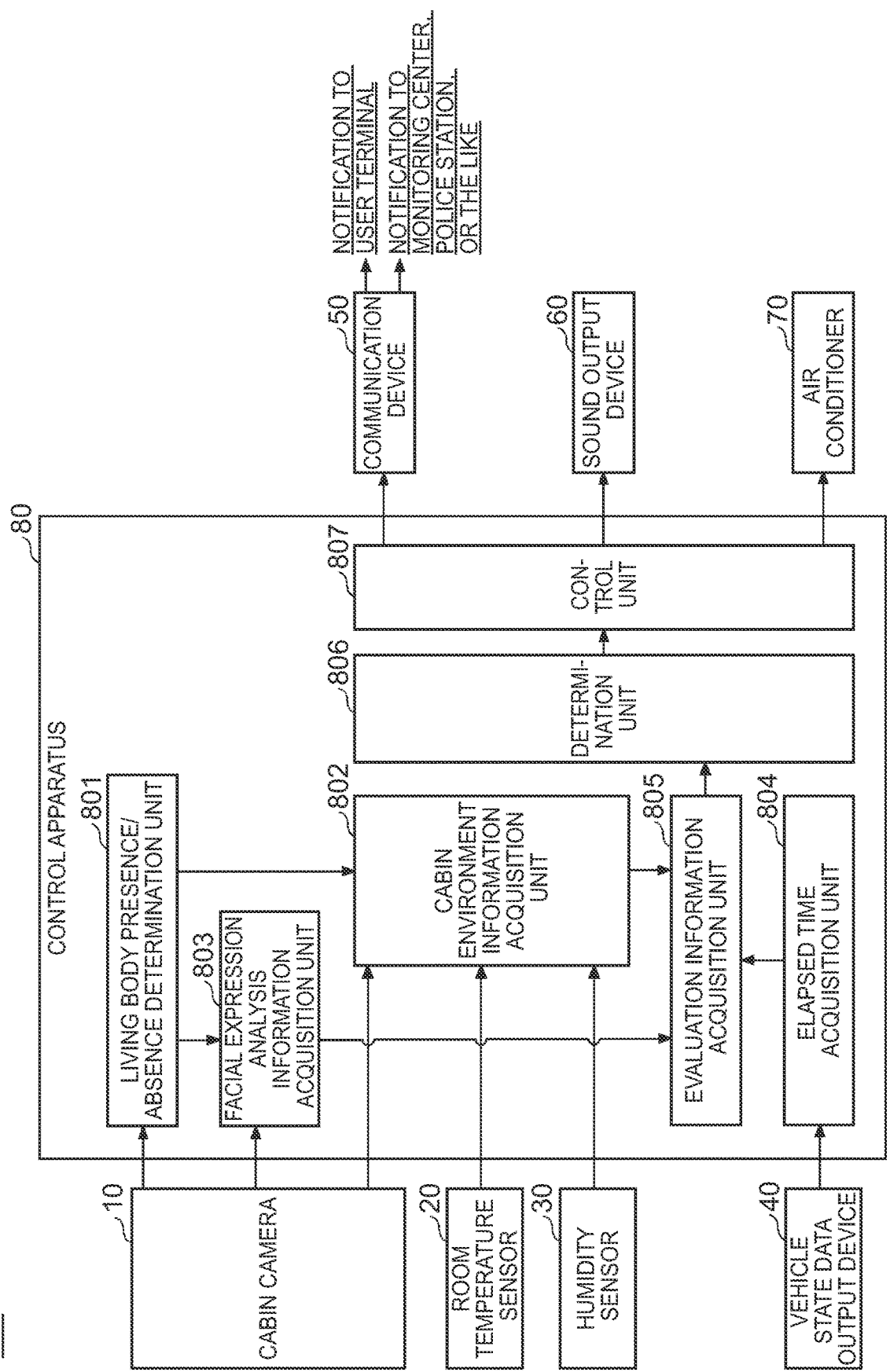
FIG. 3 is a functional block diagram showing an example of the functional configuration of the vehicle.

The user terminal 300 may be connected to the server 200 through the predetermined communication line so as to be able to communicate with the server 200 and may be connected to the vehicle 100 via the server 200 so as to be able to communicate with the vehicle 100. Hereinafter, the same applies to the case of a second example (FIG. 8) described later.
Configuration of Vehicle FIG. 2 is a diagram showing an example of the hardware configuration of the vehicle 100 concerned with the living body left-behind monitoring system 1 according to the present example. FIG. 3 is a diagram showing an example of the functional configuration of the vehicle 100 concerned with the living body left-behind monitoring system 1 according to the present example.

As shown in FIG. 2, the vehicle 100 includes a cabin camera 10, a room temperature sensor 20, a humidity sensor 30, a vehicle state data output device 40, a communication device 50, a sound output device 60, an air conditioner 70, and a control apparatus 80.

The cabin camera 10 is installed in the cabin of the vehicle 100 and captures a scene in the cabin of the vehicle 100. Specifically, the cabin camera 10 may be installed such that the faces of all the occupants on seats in the cabin are included in an image capturing range. An output (image data) of the cabin camera 10 is taken into the control apparatus 80 through a one-to-one communication line, an in-vehicle network, or the like. Examples of the in-vehicle network include a controller area network (CAN), a local interconnect network (LIN), a FlexRay, and an in-vehicle Ethernet.

The room temperature sensor 20 measures the temperature in the cabin of the vehicle 100. The room temperature sensor 20 is, for example, installed in an instrument panel. An output (measurement data) of the room temperature sensor 20 is taken into the control apparatus 80 through a one-to-one communication line, an in-vehicle network, or the like.

The humidity sensor 30 measures the humidity in the cabin of the vehicle 100. The humidity sensor 30 is, for example, installed in the instrument panel. An output (measurement data) of the humidity sensor 30 is taken into the control apparatus 80 through a one-to-one communication line, an in-vehicle network, or the like.

The vehicle state data output device 40 outputs data on the state of the vehicle 100. The vehicle state data output device 40 is, for example, a sensor that outputs measurement data on the state of the vehicle 100. The vehicle state data output device 40 is, for example, an electronic control unit (ECU) that outputs control data on the state of the vehicle 100. An output of the vehicle state data output device 40 is taken into the control apparatus 80 through a one-to-one communication line or an in-vehicle network.

The communication device 50 communicates with an external device through the predetermined communication line. The communication device 50 is, for example, a mobile communication module that is connected to a mobile communication network with a base station as a terminal and that is able to communicate with an external device. The communication device 50 may be specifically a data communication module (DCM). The communication device 50 is connected to the control apparatus 80 through a one-to-one communication line or an in-vehicle network so as to be able to communicate with the control apparatus 80. The communication device 50 may, for example, transmit a signal to an external device under control of the control apparatus 80. A signal received from an external device by the communication device 50 may be taken into the control apparatus 80.

The sound output device 60 is connected to the control apparatus 80 through a one-to-one communication line or an in-vehicle network so as to be able to communicate with the control apparatus 80. The sound output device 60 outputs a predetermined sound under control of the control apparatus 80. Examples of the sound output device 60 include a buzzer, an alarm, and a speaker.

The air conditioner 70 adjusts the temperature, humidity, and the like in the cabin of the vehicle 100. The air conditioner 70 is, for example, installed in the instrument panel. The air conditioner 70 is connected to the control apparatus 80 through a one-to-one communication line or an in-vehicle network so as to be able to communicate with the control apparatus 80. The air conditioner 70 is able to operate under control of the control apparatus 80.

The control apparatus 80 (an example of the information processing apparatus) executes control on the living body left-behind monitoring system 1. The control apparatus 80 is, for example, an ECU. The control apparatus 80 may be a special-purpose control apparatus (ECU) specialized in control on the living body left-behind monitoring system 1 or may be a general-purpose control apparatus (ECU) shared in processing with control on another function concerned with the vehicle 100.

The functions of the control apparatus 80 may be implemented by any hardware, a combination of any hardware and software, or the like. For example, as shown in FIG. 2, the control apparatus 80 is mainly made up of a computer that includes a central processing unit (CPU) 81, a memory device 82, an auxiliary storage device 83, and an interface device 84 connected to one another by a bus B1.

The CPU 81 runs a program loaded on the memory device 82 and implements various functions of the control apparatus 80 in accordance with instructions of the program.

When, for example, a startup of the program is issued, the memory device 82 loads the program from the auxiliary storage device 83 such that the CPU 81 is able to read the program. The memory device 82 is, for example, a random access memory (RAM) or the like.

The auxiliary storage device 83 is a nonvolatile storage device. The auxiliary storage device 83 stores an installed program and stores necessary files, data, and the like. The auxiliary storage device 83 is, for example, a read only memory (ROM) or the like.

The interface device 84 may be, for example, used as an interface for connection with an in-vehicle network or one-to-one connection with various sensors, actuators, and the like. The interface device 84 may include interface devices of multiple different types to support an object to be connected.

A program that implements various functions of the control apparatus 80 is, for example, provided by a dedicated tool connected by a detachable cable to a predetermined external connection connector linked with an in-vehicle network of the vehicle 100. The external connection connector is, for example, a data link coupler (DLC). A program is installed in the auxiliary storage device 83 of the control apparatus 80 from the dedicated tool via the cable, the connector, and the in-vehicle network in response to a predetermined operation on the dedicated tool. A program may be downloaded from another computer (for example, the server 200) through the predetermined communication line and installed in the auxiliary storage device 83.

As shown in FIG. 3, the control apparatus 80 includes a living body presence/absence determination unit 801, a cabin environment information acquisition unit 802, a facial expression analysis information acquisition unit 803, an elapsed time acquisition unit 804, an evaluation information acquisition unit 805, a determination unit 806, and a control unit 807 as functional units. The functional units of the control apparatus 80 are, for example, implemented by loading various programs installed in the auxiliary storage device 83 onto the memory device 82 and running the programs on the CPU 81.

The living body presence/absence determination unit 801 (an example of the first determination unit) determines whether there is a monitored living body in the cabin of the vehicle 100 based on image data taken from the cabin camera 10 when the vehicle 100 is in a parked state. In other words, the living body presence/absence determination unit 801 determines whether a monitored living body is left in the cabin of the vehicle 100 in the parked state. The parked state of the vehicle 100 corresponds to a state where the power of an accessory of the vehicle 100 is off, that is, an ACC-off state. Specifically, the living body presence/absence determination unit 801 attempts to recognize a monitored living body in the cabin of the vehicle 100 from image data taken by the cabin camera 10 by means of a known image processing technology and a known image recognition technology. When the living body presence/absence determination unit 801 recognizes a monitored living body from image data taken by the cabin camera 10, the living body presence/absence determination unit 801 determines that there is a monitored living body in the cabin of the vehicle 100. When the living body presence/absence determination unit 801 does not recognize a monitored living body, the living body presence/absence determination unit 801 determines that there is no monitored living body in the cabin of the vehicle 100. More specifically, the living body presence/absence determination unit 801 attempts to recognize a monitored living body in the cabin of the vehicle 100 at predetermined control intervals based on the latest image data taken by the cabin camera 10. The living body presence/absence determination unit 801 determines whether there is a monitored living body in the cabin of the vehicle 100 in consideration of not only a current attempt result but also past attempt results. Thus, even when no monitored living body is recognized in the current attempt due to some reasons, but a monitored living body had been recognized in the past, the control apparatus 80 may determine that there is a monitored living body in the cabin of the vehicle 100.

The living body presence/absence determination unit 801 may determine whether there is a monitored living body in the cabin of the vehicle 100 based on different data other than image data. For example, a millimeter-wave radar may be provided in the cabin of the vehicle 100, and the living body presence/absence determination unit 801 may determine whether there is a monitored living body in the cabin of the vehicle 100 based on the presence or absence of an output of measurement data indicating a minute motion of the surface of a skin due to the heart beat or pulse of a monitored living body from the millimeter-wave radar. Hereinafter, the same applies to a living body presence/absence determination unit 2001 (described later).

The cabin environment information acquisition unit 802 acquires information on cabin environment (hereinafter, cabin environment information) of the vehicle 100 based on outputs of the cabin camera 10, the room temperature sensor 20, the humidity sensor 30, and the like when the vehicle 100 is in a parked state. Specifically, cabin environment information is information indicating a physical and psychological load on a monitored living body in the cabin of the vehicle 100. Cabin environment information is, for example, a heat index (wet bulb globe temperature (WBGT)) indicating a physical and psychological load due to heat on a monitored living body in the cabin of the vehicle 100. The cabin environment information acquisition unit 802 may, for example, execute an image analysis process based on image data taken by the room temperature sensor 20 and estimate the influence of radiation heat on a monitored living body from a degree to which the sunlight enters the cabin of the vehicle 100, or another factor. With this configuration, the cabin environment information acquisition unit 802 is able to calculate a heat index based on the room temperature, humidity, and radiation heat in the cabin of the vehicle 100.

A thermosensor capable of measuring radiation heat of a component in the cabin of the vehicle 100 may be installed in the cabin of the vehicle 100. In this case, the cabin environment information acquisition unit 802 may acquire the influence of radiation heat on a monitored living body in the cabin of the vehicle 100 based on an output of the thermosensor. The cabin environment information acquisition unit 802 may acquire information indicating a physical and psychological load due to cold (for example, the room temperature or the like of the vehicle 100) on a monitored living body in the cabin of the vehicle 100.

When the living body presence/absence determination unit 801 determines that there is a monitored living body in the cabin of the vehicle 100, the facial expression analysis information acquisition unit 803 (an example of the facial expression information acquisition unit) performs a known facial expression analysis on the face of the monitored living body contained in image data taken by the cabin camera 10 based on the image data. The facial expression analysis information acquisition unit 803 acquires information on the result of analysis of the facial expression (hereinafter, facial expression analysis information) of the face of the monitored living body contained in the image data taken by the cabin camera 10. Facial expression analysis information includes information on the emotion of a monitored living body (hereinafter, emotion information), information on the face state of a monitored living body (hereinafter, face state information), and information on the age of a monitored living body (hereinafter, age information).

Emotion information includes types of the emotion of a monitored living body, estimated from the facial expression of the face of the monitored living body. Examples of the types of the emotion include a positive emotion, a neutral emotion, and a negative emotion. A positive emotion can include an emotion, such as "delightful", "fun", and "happy". A negative emotion can include an emotion, such as "angry", "sad", "surprised", and "fearful".

Face state information includes types of the face state of a monitored living body, appearing in the facial expression of the face of the monitored living body. Examples of the types of the face state include a positive face state, a neutral face state, and a negative face state. Examples of the positive face state include a smiling state. Examples of the negative face state include a crying state. Examples of the negative face state may include an eye closed state. This is because when a monitored living body keeps the eyes closed, it is estimated that fatigue due to a physical and psychological load may be relatively large.

The frequency (period) at which the facial expression analysis information acquisition unit 803 performs facial expression analysis may be the same as the frequency (period) at which the cabin camera 10 acquires image data or may be set so as to be less than the frequency (period) at which the cabin camera 10 acquires image data. The frequency (period) at which the facial expression analysis information acquisition unit 803 performs facial expression analysis may be variable. For example, based on the cabin environment information, the frequency of facial expression analysis may be set so as to be greater as the cabin environment of the vehicle 100 is in a state where a physical and psychological load on a monitored living body is higher and may be set so as to be lower as the cabin environment of the vehicle 100 is in a state where the load is lower. With this configuration, the control apparatus 80 is able to reduce a processing load and is able to, when the cabin environment of the vehicle 100 is in a situation where a physical and psychological load is relatively high, implement facial expression analysis in real time and capture a change in the facial expression of a monitored living body in real time.

The elapsed time acquisition unit 804 acquires an elapsed time for which a monitored living body has been left in the cabin of the vehicle 100 (hereinafter, left-behind elapsed time) based on an output of the vehicle state data output device 40. For example, the elapsed time acquisition unit 804 acquires a left-behind elapsed time by using a timer function of a real time clock (RTC), or the like, built in the control apparatus 80. The left-behind elapsed time may be, for example, an elapsed time from a time point at which the vehicle 100 is stopped (that is, ACC-off). A left-behind elapsed time may be an elapsed time from a time point at which, after a stop of the vehicle 100, a presence of a monitored living body is determined for the first time.

Alternatively, a left-behind elapsed time may be, for example, an elapsed time from a start point that is a time point at which a door of the vehicle 100 is closed last time before a time point at which, after a stop of the vehicle 100, a presence of a monitored living body is determined for the first time.

When the living body presence/absence determination unit 801 determines that there is a living body in the cabin of the vehicle 100, the evaluation information acquisition unit 805 (an example of the estimation unit) estimates a degree of decrease in the safety of the life of a monitored living body in the vehicle 100. Specifically, in a situation in which a monitored living body is left in the cabin of the vehicle 100, the evaluation information acquisition unit 805 acquires information indicating an evaluated degree of decrease in the safety of the life of the monitored living body in the vehicle 100 (hereinafter, evaluation information) based on cabin environment information, facial expression analysis information, and a left-behind elapsed time at predetermined control intervals.

The evaluation information acquisition unit 805 may, for example, calculate an index value indicating a degree of decrease in the safety of the life of a monitored living body in the vehicle 100 (hereinafter, evaluation index) EI as evaluation information.

The evaluation index EI has, for example, a value greater than or equal to zero and is defined in accordance with such a correlation that, as the value increases, a degree of decrease in the safety of the life of a monitored living body left in the cabin of the vehicle 100 is estimated to be higher. Specifically, an evaluation index EI may be calculated by the following expressions (1) and (2) by using a cabin environment index W chosen based on cabin environment information, a facial expression analysis index F chosen based on facial expression analysis information, a left-behind elapsed time t, and an adjustment index β.

$$EI = \alpha t + \beta \quad (1)$$

$$\alpha = W + F \quad (2)$$

With this configuration, the control apparatus 80 is able to calculate an evaluation index EI so as to be able to adjust a rate of advance α of a degree of decrease in the safety of the life of a monitored living body by using the cabin environment index W and the facial expression analysis index F on the assumption that the degree of decrease in the safety of the life of the monitored living body increases with an increase in left-behind elapsed time t.

Another index other than the cabin environment index W or the facial expression analysis index F may be considered for the rate of advance α. For example, an index related to the activity of a monitored living body may be considered for the rate of advance α. Specifically, the presence or absence of an activity of a monitored living body, related to a decrease in the safety of the life, the number of times of the activity, or the like may be considered for the rate of advance α, and the rate of advance α may be set such that, as the number of times of the activity increases, the rate of advance α increases.

The cabin environment index W has a value greater than or equal to zero and is set so as to increase as a physical and psychological load on a monitored living body due to an environment in the cabin of the vehicle 100 increases. When, for example, the heat index (WBGT) is employed as cabin environment information, the cabin environment index W is set so as to increase as the heat index increases.

For example, FIG. 4 is a table illustrating an example of a method of choosing an evaluation index EI. Specifically, FIG. 4 is a table illustrating an example of a method of choosing a cabin environment index W.

As shown in FIG. 4, predetermined values W1, W2, W3 greater than zero are respectively assigned as heat indexes to three ranges, that is, a range lower than 25° C., a range higher than or equal to 25° C. and lower than 28° C., and a range higher than 28° C. The predetermined values W1, W2, W3 respectively assigned to the ranges are defined such that the cabin environment index W increases as the heat index increases (becomes higher) (W1<W2<W3). With this configuration, the evaluation information acquisition unit 805 is able to choose a cabin environment index W by determining to which range the heat index applies as cabin environment information.

The range of the heat index higher than or equal to 28° C. may be divided into a range higher than or equal to 28° C. and lower than 31° C. and a range higher than or equal to 31° C., and the value of the cabin environment index W may be set so as to be greater in the case of the latter range than in the case of the former range. In the case of the range in which the heat index is higher than or equal to 31° C., the influence may be incorporated in the adjustment index β, and the adjustment index β may be set so as to be greater than that in the case where the heat index is lower than 31° C.

The facial expression analysis index F is an index having a value greater than or equal to zero and used to evaluate a physical and psychological load on a monitored living body due to the cabin environment of the vehicle 100 from facial expression analysis information. The facial expression analysis index F is defined so as to increase as facial expression analysis information indicates a greater physical and psychological load on a monitored living body. The facial expression analysis index F may be, for example, calculated by the following expression (3) by using an emotion index FE chosen based on emotion information, a face state index FS chosen based on face state information, and an age index FA chosen based on age information.

$$F = FE + FS + FA \quad (3)$$

The emotion index FE is an index having a value greater than or equal to zero and used to evaluate a physical and psychological load of a monitored living body left in the cabin of the vehicle 100 from the viewpoint of the emotion of the monitored living body. The emotion index FE is defined so as to increase as emotion information indicates a greater physical and psychological load on a monitored living body. The emotion index FE is, for example, defined such that the emotion index FE in the case where emotion information indicates a negative emotion of a monitored living body is greater than the emotion index FE in the case where emotion information indicates a positive emotion or neutral emotion of a monitored living body. When, for example, emotion information indicates a negative emotion of a monitored living body, the emotion index FE may be variable depending on the type of the negative emotion. This is because the type of a negative emotion can vary depending on a degree of decrease in the safety of the life of a monitored living body.

For example, FIG. 5 is a table showing an example of a method of choosing an evaluation index EI. Specifically, FIG. 5 is a table illustrating an example of a method of choosing a facial expression analysis index F.

As shown in FIG. 5, for example, when emotion information indicates a positive emotion, the emotion index FE is set to a minimum predetermined value FE0 (>0), and, when emotion information indicates a negative emotion, the emotion index FE is set to any one of predetermined values FE1, FE2, FE3 greater than the predetermined value FE0 according to the type of the negative emotion. Specifically, the emotion index FE is set to the predetermined value FE1 when emotion information indicates a "surprised" emotion, set to the predetermined value FE2 (>FE1) when emotion information indicates a "sad" emotion, and set to the predetermined value FE3 (>FE2) when emotion information indicates an "angry" emotion.

The magnitude relation among the values of the emotion indexes FE defined according to the type of a negative emotion is an example, and another magnitude relation may be defined. Categories of the type of a negative emotion for varying the emotion index FE may include another type of emotion, such as "fearful", in addition to "surprised", "sad", and "angry".

The face state index FS is an index having a value greater than or equal to zero and used to evaluate a physical and psychological load of a monitored living body left in the cabin of the vehicle 100 from the face state of the monitored living body. The face state index FS is defined so as to increase as face state information indicates a greater physical and psychological load on a monitored living body. A face state index FS is, for example, defined such that the face state index FS in the case where face state information indicates a negative face state of a monitored living body is greater than the face state index FS in the case where face state information indicates a positive face state or neutral face state of a monitored living body. When, for example, face state information indicates a negative face state of a monitored living body, the face state index FS may be variable depending on the type of the negative face state. This is because the type of a negative face state can vary depending on a degree of decrease in the safety of the life of a monitored living body.

As shown in FIG. 5, for example, when face state information indicates a positive emotion, the face state index FS is set to a predetermined value FS0 (>0), and, when face state information indicates a negative emotion, the face state index FS is set to any one of predetermined values FS1, FS2 greater than the predetermined value FS0 according to the type. Specifically, the face state index FS is set to the predetermined value FS1 when face state information indicates a "crying" face state and set to the predetermined value FS2 (>FS1) when face state information indicates an eye closed state. This is because the state where a monitored living body keeps the eyes closed can be estimated as, for example, a situation in which a degree of decrease in the safety of the life of the monitored living body is relatively low and the monitored living body is difficult to respond with a face state.

The age index FA is an index having a value greater than or equal to zero and used to evaluate a physical and psychological load of a monitored living body left in the cabin of the vehicle 100 from the age of the monitored living body. This is because resistance to a load can vary depending on the age of a monitored living body. The age index FA is defined so as to increase as the age of a monitored living body indicates lower resistance to a physical and psychological load. When, for example, the age of a monitored living body corresponds to a newborn child or an infant child, the age index FA may be set to a relatively large value. A newborn child, for example, corresponds to a monitored living body at the age of zero, and an infant child, for example, corresponds to a monitored living body at the age of one to five. When, for example, the age of a monitored living body corresponds to an elderly person, the age index FA may be set to a relatively large value. An elderly person, for example, corresponds to a monitored living body at the age of 65 or over.

As shown in FIG. 5, the age index FA is set to any one of predetermined values FA0, FA1, FA2, FA3, FA4 depending on, for example, which one of age categories, that is, "junior high school students or over (except elderly people)", "elementary school students", "elderly people", "infant children", and "newborn children" age information indicates. The category "junior high school students or over (except elderly people)" corresponds to a monitored living body at the age of 12 or over and under 65. The category "elementary school students" corresponds to a monitored living body at the age of six or over and under 12. Specifically, the age index FA is set to a minimum predetermined value FA0 when age information indicates an age corresponding to "junior high school students or over (except elderly people)" and is set to a second minimum predetermined value FA1 (>FA0) when age information indicates an age corresponding to "elementary school students". On the other hand, when age information indicates an age corresponding to "elderly people", the age index FA is set to a relatively large predetermined value FA2 (>FA1). When age information indicates an age corresponding to "infant children", the age index FA is set to a relatively large predetermined value FA3 (>FA2). When age information indicates an age corresponding to "newborn children", the age index FA is set to a relatively large predetermined value FA4 (>FA3).

The magnitude relation among age indexes FA respectively corresponding to the categories "elderly people", "infant children", and "newborn children" is an example, and another magnitude relation may be defined.

The adjustment index β is, for example, used to adjust an evaluation index EI such that, when the rate of advance α changes, the evaluation index EI changes at the rate of advance α with reference to a value just before the evaluation index EI changes (see FIG. 6 (described later)). As described above, the adjustment index β is set such that the adjustment index β in the case where the heat index is higher than or equal to 31° C. is greater than the adjustment index β in the case where the heat index is lower than 31° C. Thus, the influence of the case where the heat index is higher than or equal to 31° C. on a decrease in the safety of the life of a monitored living body may be considered.

At least one of cabin environment information and facial expression analysis information may be incorporated into the adjustment index β instead of or in addition to the rate of advance α.

Referring back to FIG. 3, the determination unit 806 (an example of the second determination unit) determines whether the safety of the life of a monitored living body is lower than or equal to a predetermined reference based on evaluation information sequentially acquired by the evaluation information acquisition unit 805 in a situation in which the monitored living body is left in the cabin of the vehicle 100.

Specifically, when the evaluation index EI calculated by the evaluation information acquisition unit 805 is greater than or equal to a predetermined threshold EI_th, the determination unit 806 may determine that the safety of the life of a monitored living body is lower than or equal to the predetermined reference.

For example, FIG. 6 is a graph showing a specific example of a time-sequence change of the evaluation index EI in the case where a monitored living body (for example, an infant child) is left in the cabin of the vehicle 100.

As shown in FIG. 6, in a period TP1 in which the left-behind elapsed time t changes from 0 to a predetermined value t1, cabin environment information (heat index), emotion information, and face state information respectively indicate a state lower than 25° C., a positive emotion, and a neutral face state. Therefore, with an increase in the left-behind elapsed time t, the evaluation index EI increases at a relatively small slope (rate of advance α).

After that, when the left-behind elapsed time t reaches the predetermined value t1, cabin environment information (heat index) and emotion information respectively shift (deteriorate) into a state higher than or equal to 25° C. and lower than 28° C. and a negative emotion. Therefore, in a period TP2 in which the left-behind elapsed time t changes from the predetermined value t1 to a predetermined value t2, a rate of increase (rate of advance α) in the evaluation index EI for an increase in the left-behind elapsed time t is higher than that in the period TP1, and an increase in the evaluation index EI is accelerating.

When the left-behind elapsed time t reaches the predetermined value t2, the face state of the monitored living body shifts (deteriorates) from a neutral state to a crying state. Therefore, in a period TP3 in which the left-behind elapsed time t is later than the predetermined value t2, a rate of increase (rate of advance α) in the evaluation index EI for an increase in the left-behind elapsed time t is higher than that in the period TP2, and an increase in the evaluation index EI is further accelerating.

The evaluation index EI reaches the threshold EI_th when the left-behind elapsed time t reaches the predetermined value t3, and the determination unit 806 determines that the safety of the life of the monitored living body is lower than or equal to the predetermined reference.

Referring back to FIG. 3, when the determination unit 806 determines that the safety of the life of the monitored living body left in the cabin of the vehicle 100 is lower than or equal to the predetermined reference, the control unit 807 activates the safety function.

The safety function may include, for example, a function of issuing an alarm about a monitored living body left in the cabin of the vehicle 100 to around the vehicle 100 (hereinafter, vehicle surrounding alarm function). Specifically, the control unit 807 causes the sound output device 60 to output auditory information (sound information) on a monitored living body left in the cabin of the vehicle 100 to around the vehicle 100. Examples of the alarm about a monitored living body left behind may include an alarm indicating a state where a monitored living body is left in the cabin of the vehicle 100 and an alarm indicating that the safety of the life of a monitored living body is decreasing because the monitored living body is left in the cabin of the vehicle 100. With this configuration, the control apparatus 80 is able to issue an alarm about the presence of a monitored living body left in the cabin of the vehicle 100, a decrease in the safety of the life of the monitored living body, or the like to people around the vehicle 100. Therefore, the control apparatus 80 is able to prompt people around the vehicle 100 to provide a notification to a predetermined agency (for example, a police station PS) or the like.

The safety function may include, for example, a function of providing a notification about a monitored living body left in the cabin of the vehicle 100 to a user of the vehicle 100 through the user terminal 300 (hereinafter, user alarm function). Specifically, the control unit 807 may implement a user alarm function by communicating with the user terminal 300 and transmitting an alarm signal (push notification) on a monitored living body left in the cabin of the vehicle 100 to the user terminal 300 by using the communication device 50. With this configuration, the control apparatus 80 is able to prompt the user of the vehicle 100 away from the vehicle 100 to return to the vehicle 100 by causing the user to recognize that a monitored living body left behind or causing the user to grasp a decrease in the safety of the life of a monitored living body left behind.

The safety function may include, for example, a function of issuing an alarm (providing a notification) about a monitored living body left in the cabin of the vehicle 100 to an operator OP or the like of the monitoring center CT (an example of the predetermined facility) (hereinafter, operator notification function). Specifically, the control unit 807 may implement an operator alarm function by communicating with the server 200 and transmitting an alarm signal on a monitored living body left in the cabin of the vehicle 100 to the server 200 by using the communication device 50. With this configuration, the control apparatus 80 is able to inform the fact that a monitored living body is left in the cabin of the vehicle 100, the fact that the safety of the life of a monitored living body left behind, or the like to the operator OP or the like of the monitoring center CT through the server 200. Therefore, the control apparatus 80 is able to prompt the operator OP or the like of the monitoring center CT to contact the user of the vehicle 100, to provide a notification to a police station PS, to arrange an ambulance, or the like.

The safety function may include, for example, a function of issuing an alarm (providing a notification) about a monitored living body left in the cabin of the vehicle 100 to a police station PS (an example of the predetermined facility) (hereinafter, police station notification function). Specifically, the control unit 807 may implement a police station notification function by communicating with a police station PS (for example, automatic voice call or the like) and providing a notification about a monitored living body left in the cabin of the vehicle 100 by using the communication device 50. With this configuration, the control apparatus 80 is able to request for dispatch to a police station PS or make a request for arrangement of an ambulance through a police station PS.

The safety function may include, for example, a function of operating the air conditioner 70 (hereinafter, air conditioner operating function). With this configuration, the control apparatus 80 is, for example, able to activate a cooling function of the air conditioner 70 in a situation in which the cabin environment of the vehicle 100 is deteriorating in a direction in which the heat index increases. The control apparatus 80 is, for example, able to activate a heating function of the air conditioner 70 in a situation in which the cabin environment of the vehicle 100 is deteriorating in a direction in which the room temperature extremely decreases as in the case where the room temperature of the vehicle 100 is below-freezing temperature.

In this way, in this example, the control apparatus 80 is able to determine (estimate) a degree of decrease in the safety of the life of a monitored living body left in the cabin of the vehicle 100 in consideration of an emotion, a face state, an age, or the like specific to the monitored living body by using facial expression analysis information. Therefore, the control apparatus 80 is able to ensure the safety of the life of a monitored living body in the cabin of the vehicle 100 in consideration of an individual difference of the monitored living body.

Process Flow of Control Apparatus

Figure 7:
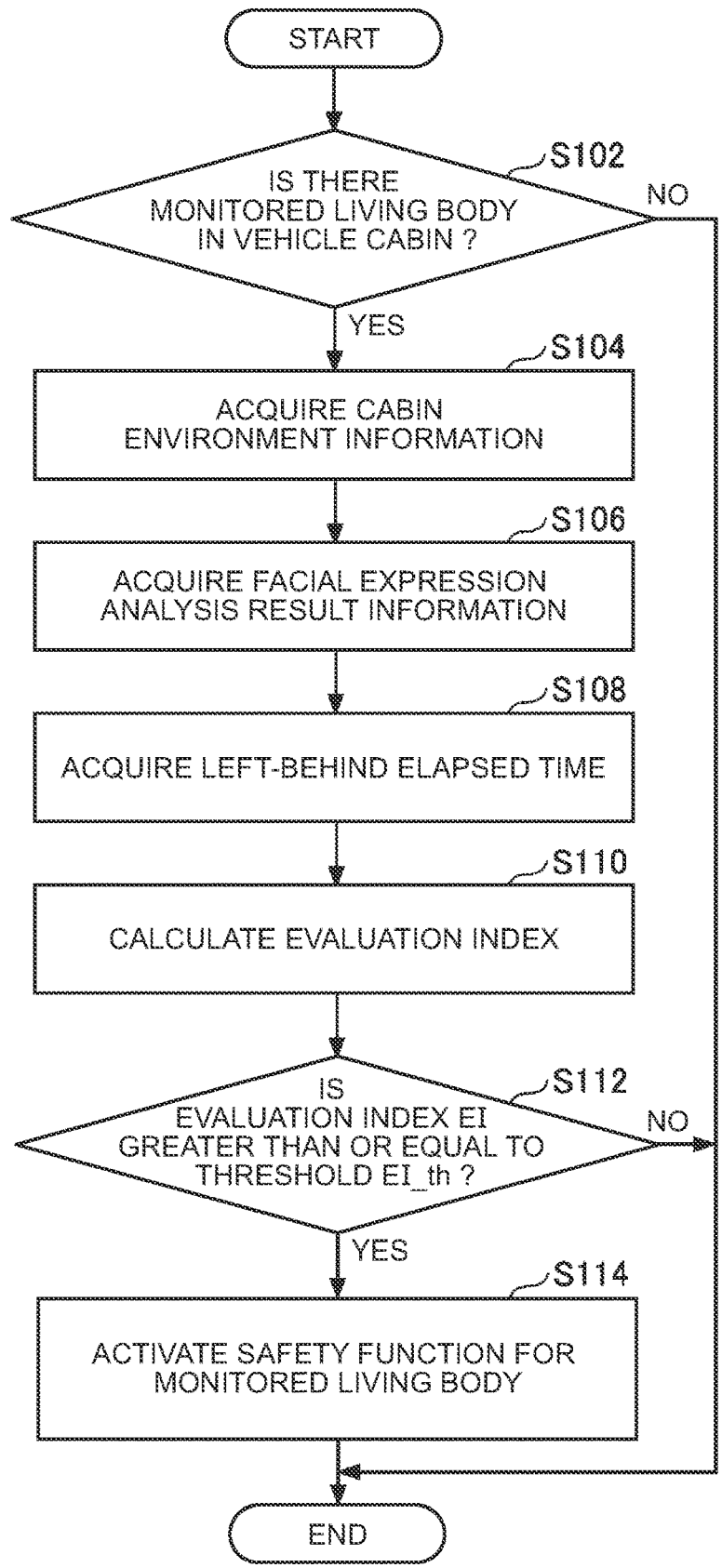
FIG. 7 is a flowchart schematically showing an example of a living body left-behind monitoring process.

FIG. 7 is a flowchart schematically showing an example of a living body left-behind monitoring process executed by the control apparatus 80. The flowchart is, for example repeatedly executed at predetermined control intervals when the vehicle 100 is in a parked state.

As shown in FIG. 7, in step S102, the living body presence/absence determination unit 801 determines whether there is a monitored living body in the cabin of the vehicle 100. When there is a monitored living body in the cabin of the vehicle 100, the living body presence/absence determination unit 801 proceeds to step S104; whereas, when there is no monitored living body in the cabin of the vehicle 100, the living body presence/absence determination unit 801 ends the process of the current flowchart.

In step S104, the cabin environment information acquisition unit 802 acquires cabin environment information.

When the control apparatus 80 completes the process of step S104, the control apparatus 80 proceeds to step S106.

In step S106, the facial expression analysis information acquisition unit 803 acquires the latest facial expression analysis information. The latest facial expression analysis information is facial expression analysis information output during a process period of the flowchart or facial expression analysis information acquired last time before the process period of the flowchart. This is because the frequency of facial expression analysis can be less than the process frequency of the flowchart, or the frequency of facial expression analysis can be variable as described above.

When the control apparatus 80 completes the process of step S106, the control apparatus 80 proceeds to step S108.

In step S108, the elapsed time acquisition unit 804 acquires a left-behind elapsed time.

When the control apparatus 80 completes the process of step S108, the control apparatus 80 proceeds to step S110.

In step S110, the evaluation information acquisition unit 805 acquires (calculates) an evaluation index EI based on the acquired cabin environment information, facial expression analysis information, and left-behind elapsed time.

When the control apparatus 80 completes the process of step S110, the control apparatus 80 proceeds to step S112.

In step S112, the determination unit 806 determines whether the evaluation index EI is greater than or equal to a threshold EI_th. When the evaluation index EI is greater than or equal to the threshold EI_th, the determination unit 806 determines that the safety of the life of the monitored living body is lower than or equal to a predetermined reference, and proceeds to step S114. When the evaluation index EI is not greater than or equal to the threshold EI_th, the determination unit 806 ends the process of the current flowchart.

In step S114, the control unit 807 activates the safety function. Thus, the control apparatus 80 is able to ensure the safety of the life of the monitored living body left in the cabin of the vehicle 100.

In this way, the control apparatus 80 is able to monitor a degree of decrease in the safety of the life of a monitored living body left in the cabin of the vehicle 100 by sequentially calculating an evaluation index EI and monitoring whether the evaluation index EI is greater than or equal to the threshold EI_th at predetermined control intervals. When the evaluation index EI is greater than or equal to the threshold EI_th, the control apparatus 80 is able to ensure the safety of the life of a monitored living body by activating the safety function.

Second Example of Living Body Left-behind Monitoring System

A second example of the living body left-behind monitoring system 1 according to the present embodiment will be described with reference to FIG. 8 and FIG. 9. Hereinafter, like reference signs denote the same or corresponding components to those of the first example, and portions different from the first example will be mainly described.

Outline of Living Body Left-behind Monitoring System

Figure 8:
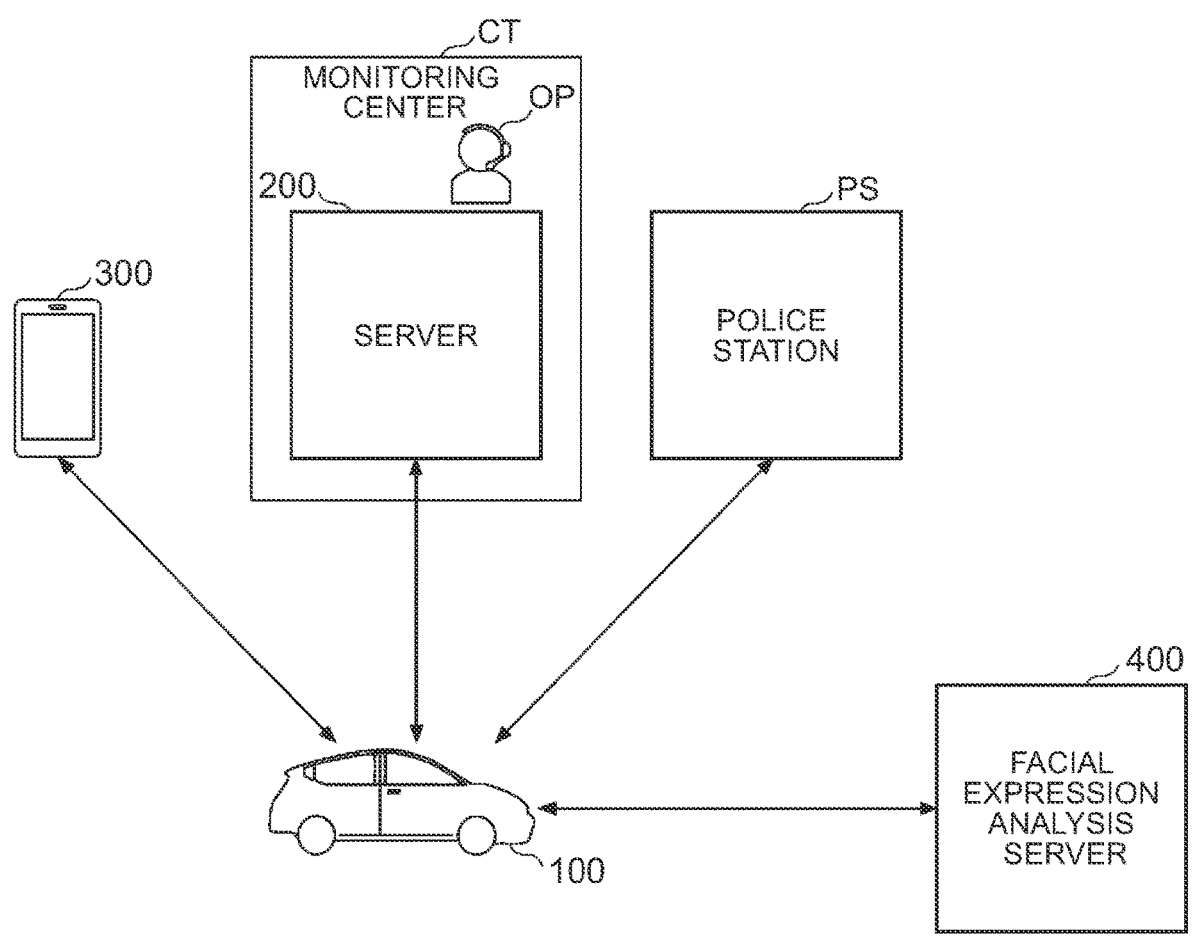
FIG. 8 is a diagram showing a second example of a living body left-behind monitoring system.

FIG. 8 is a schematic diagram showing the second example of the living body left-behind monitoring system 1.

As shown in FIG. 8, the living body left-behind monitoring system 1 includes the vehicle 100, the server 200, the user terminal 300, and a facial expression analysis server 400.

The facial expression analysis server 400 is connected to the vehicle 100 through the predetermined communication line so as to be able to communicate with the vehicle 100. The facial expression analysis server 400 performs facial expression analysis based on image data from the cabin camera 10, transmitted (uploaded) from the vehicle 100, and returns a signal including information on the facial expression analysis result to the vehicle 100. With this configuration, the vehicle 100 (control apparatus 80) is, for example, able to reduce a processing load for monitoring a degree of decrease in the safety of the life of a living body left in the cabin. The vehicle 100 is able to suppress a decrease in the remaining capacity of a battery of the vehicle 100 with a reduction in the processing load of the control apparatus 80.

Configuration of Vehicle

Figure 9:
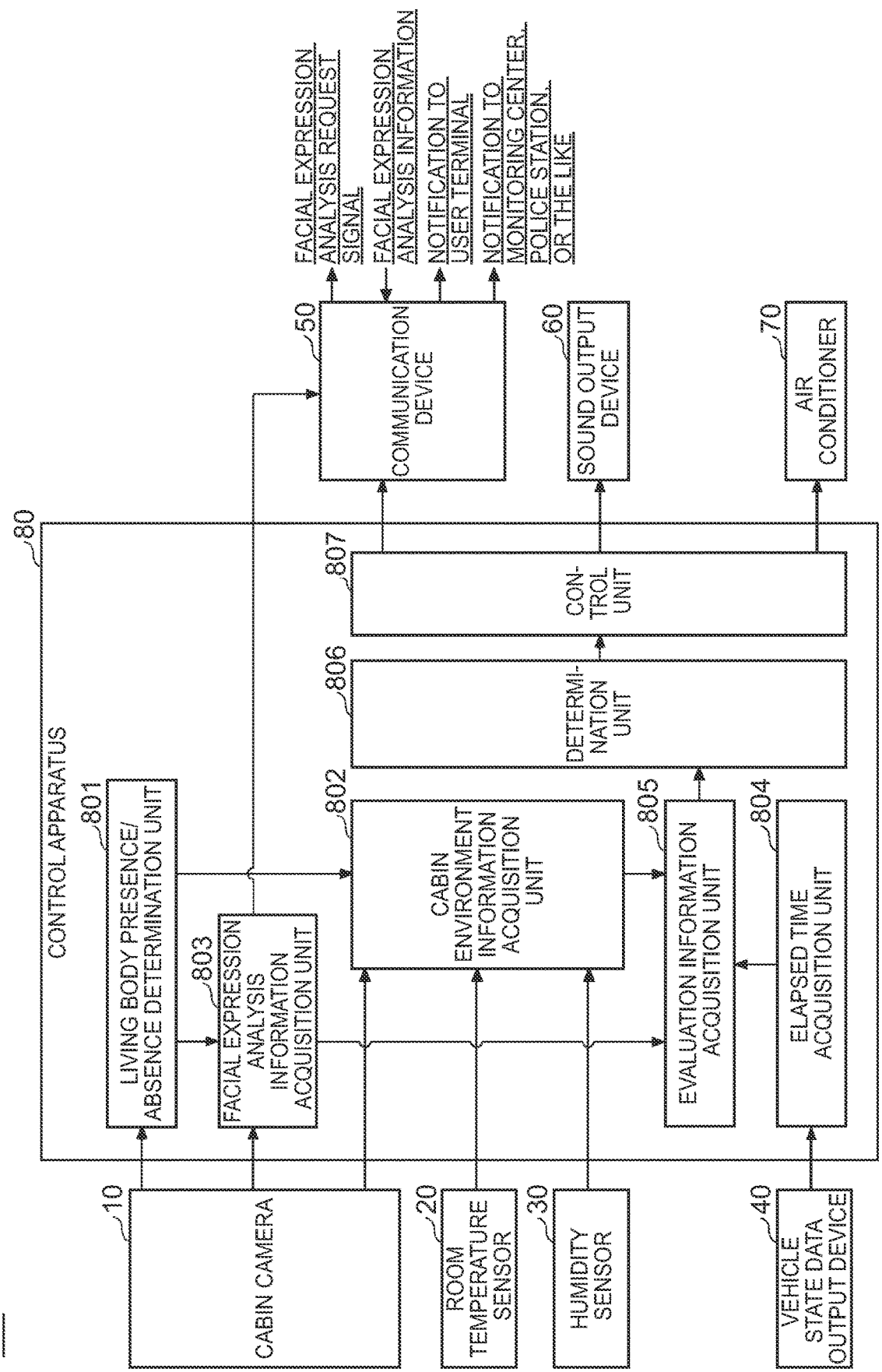
FIG. 9 is a functional block diagram showing another example of the functional configuration of a vehicle.

FIG. 9 is a functional block diagram showing another example of the functional configuration of the vehicle 100 concerned with the living body left-behind monitoring system 1.

The hardware configuration of the vehicle 100 concerned with the living body left-behind monitoring system 1 is similar to that of the first example and is shown in FIG. 2, so the hardware configuration of the vehicle 100 is not shown.

The vehicle 100, as in the case of the first example, includes the cabin camera 10, the room temperature sensor 20, the humidity sensor 30, the vehicle state data output device 40, the communication device 50, the sound output device 60, the air conditioner 70, and the control apparatus 80.

As shown in FIG. 9, the control apparatus 80, as in the case of the first example, includes the living body presence/absence determination unit 801, the cabin environment information acquisition unit 802, the facial expression analysis information acquisition unit 803, the elapsed time acquisition unit 804, the evaluation information acquisition unit 805, the determination unit 806, and the control unit 807 as functional units.

The facial expression analysis information acquisition unit 803 transmits a signal for requesting facial expression analysis (hereinafter, facial expression analysis request signal) to the facial expression analysis server 400 and transmits (uploads) image data taken by the cabin camera 10 to the facial expression analysis server 400 through the communication device 50.

The facial expression analysis server 400 performs facial expression analysis of uploaded image data and returns information on a facial expression analysis result (facial expression analysis information) to the vehicle 100 in response to a facial expression analysis request signal received from the vehicle 100.

With this configuration, the facial expression analysis information acquisition unit 803 is able to acquire facial expression analysis information returned from the facial expression analysis server 400.

The frequency (period) at which a facial expression analysis request signal is transmitted to the facial expression analysis server 400 through the communication device 50 may be the same as the frequency (period) at which the cabin camera 10 acquires image data or may be set so as to be less than the frequency (period) at which the cabin camera 10 acquires image data. The frequency (period) at which a facial expression analysis request signal is transmitted to the facial expression analysis server 400 may be variable as in the case of the frequency of facial expression analysis of the first example. With this configuration, the control apparatus 80 is able to reduce a communication load or communication fee and is able to, when the cabin environment of the vehicle 100 is in a situation where a physical and psychological load is relatively high, implement facial expression analysis in real time and capture a change in the facial expression of a monitored living body in real time.

In this way, in this example, the control apparatus 80 is able to make a request of the facial expression analysis server 400 for facial expression analysis of image data and to acquire facial expression analysis information from the facial expression analysis server 400. With this configuration, the control apparatus 80 is able to reduce a processing load in monitoring a monitored living body left in the cabin of the vehicle 100.

The control apparatus 80 may not only perform facial expression analysis of image data but also make a request of an external device to execute an image recognition process of recognizing a monitored living body from image data. In this case, the living body presence/absence determination unit 801 determines whether there is a monitored living body in the cabin of the vehicle 100 based on a result of image recognition process, returned from the external device. With this configuration, the control apparatus 80 is able to further reduce a processing load in monitoring a monitored living body left in the cabin of the vehicle 100.

Third Example of Living Body Left-behind Monitoring System

A third example of the living body left-behind monitoring system 1 according to the present embodiment will be described with reference to FIG. 10 to FIG. 12. Hereinafter, like reference signs denote the same or corresponding components to those of the first example or the second example, and portions different from the first example or the second example will be mainly described.

Outline of Living Body Left-behind Monitoring System

Figure 10:
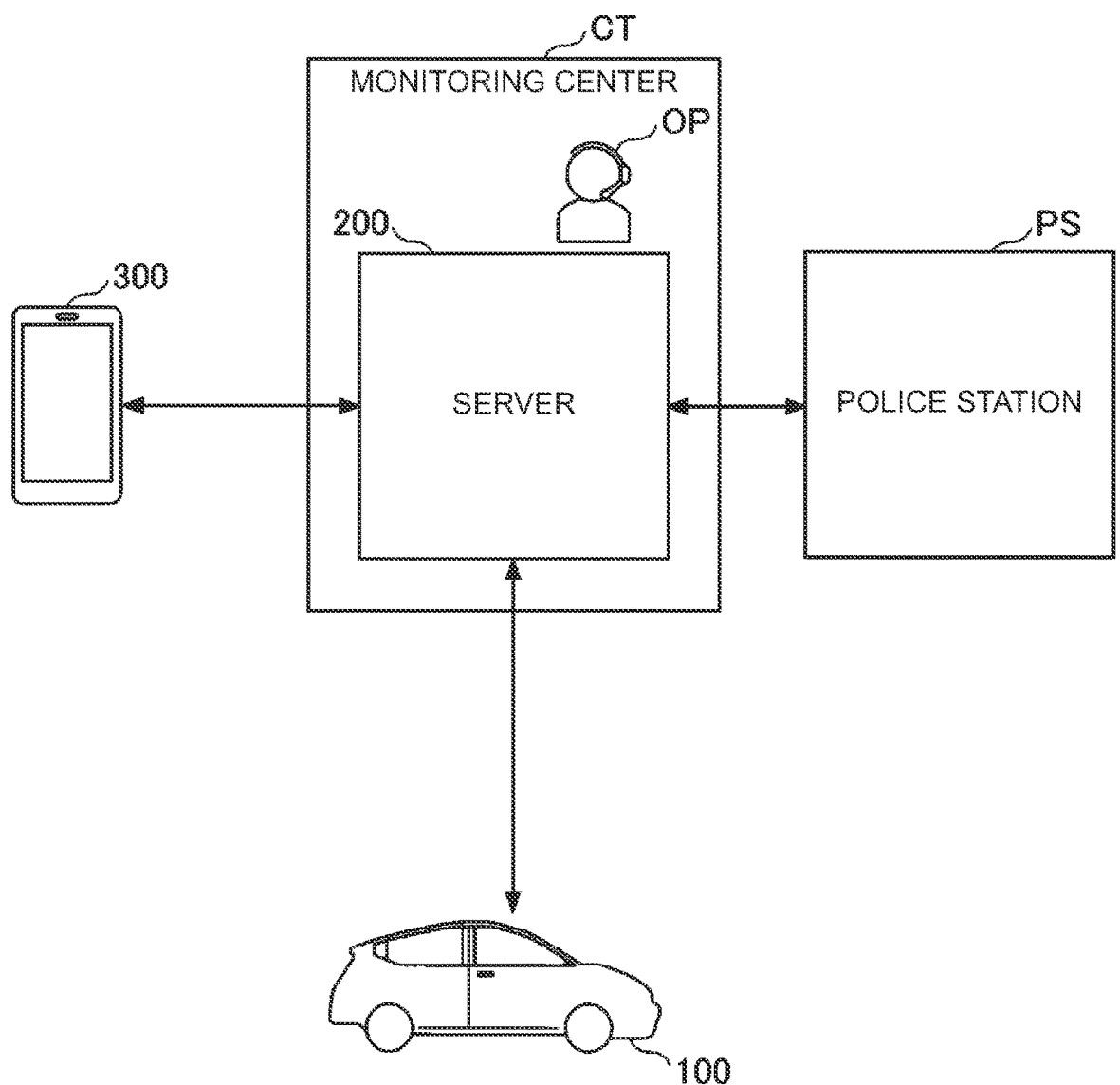
FIG. 10 is a diagram showing a third example of a living body left-behind monitoring system.

FIG. 10 is a schematic diagram showing the third example of the living body left-behind monitoring system 1.

As shown in FIG. 10, the living body left-behind monitoring system 1 includes the vehicle 100, the server 200, and the user terminal 300.

When the vehicle 100 is in a parked state, the vehicle 100 transmits (uploads), to the server 200, various data for determining whether there is a monitored living body left in the cabin and monitoring a degree of decrease in the safety of the monitored living body (hereinafter, monitoring data). The monitoring data includes image data taken by the cabin camera 10, output data (measurement data) of the room temperature sensor 20, output data (measurement data) of the humidity sensor 30, output data of the vehicle state data output device 40, and the like.

The server 200 (an example of the information processing apparatus) has a function of determining whether there is a predetermined monitored living body left in the cabin of the vehicle 100 based on monitoring data transmitted from the vehicle 100 and, when there is a monitored living body, monitoring a degree of decrease in the safety of the life of the monitored living body. When the safety of the life of the monitored living body left in the cabin is lower than or equal to the predetermined reference, the server 200 activates the safety function.

The user terminal 300 is connected to the server 200 through the predetermined communication line so as to be able to communicate with the server 200. With this configuration, the user terminal 300 is able to receive a signal transmitted from the server 200 and to cause a user (the user of the vehicle 100) to grasp information included in the signal through a display, a speaker, or the like.

Configuration of Server

Figure 11:
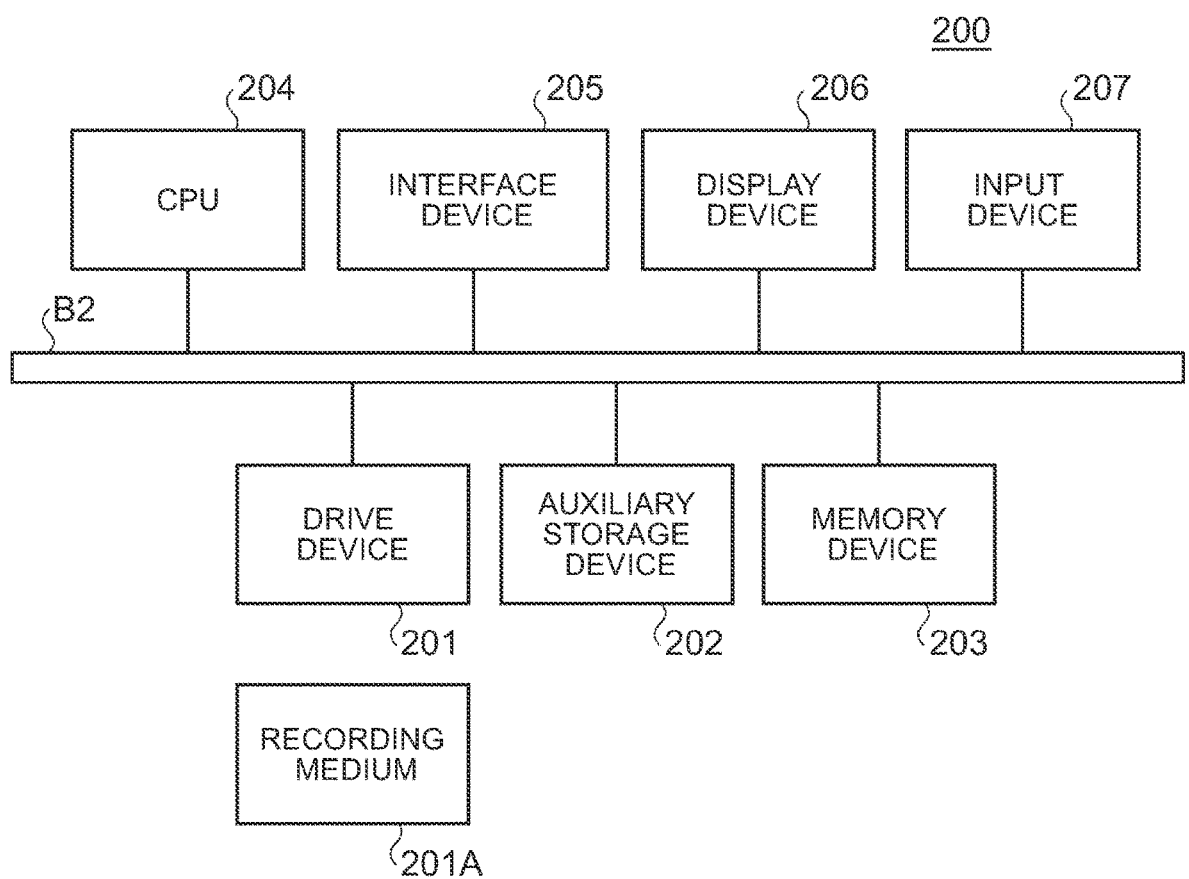
FIG. 11 is a diagram showing an example of the hardware configuration of a server.

FIG. 11 is a diagram showing an example of the hardware configuration of the server 200 concerned with the living body left-behind monitoring system 1. FIG. 12 is a functional block diagram showing an example of the functional configuration of the server 200 concerned with the living body left-behind monitoring system 1.

The hardware configuration of the vehicle 100 according to this example is similar to those of the first and other examples and is shown in FIG. 2. In this example, the functions of the living body presence/absence determination unit 801, the cabin environment information acquisition unit 802, the facial expression analysis information acquisition unit 803, the elapsed time acquisition unit 804, the evaluation information acquisition unit 805, the determination unit 806, and the control unit 807 of the control apparatus 80 are omitted and are assigned to the server 200 as will be described later.

The functions of the server 200 may be implemented by any hardware, a combination of any hardware and software, or the like. For example, as shown in FIG. 11, the server 200 includes a drive device 201, an auxiliary storage device 202, a memory device 203, a CPU 204, an interface device 205, a display device 206, and an input device 207, which are connected to one another by a bus B2.

Programs that implement the various functions of the server 200 are provided by, for example, a portable recording medium 201A, such as a compact disc read only memory (CD-ROM), a digital versatile disc read only memory (DVD-ROM), and a universal serial bus (USB) flash drive. As the recording medium 201A on which the programs are recorded is loaded in the drive device 201, the programs are installed from the recording medium 201A to the auxiliary storage device 202 via the drive device 201. The programs may be downloaded from another computer via a communication network and installed into the auxiliary storage device 202.

The auxiliary storage device 202 stores various installed programs and stores necessary files, data, and the like.

As the memory device 203 receives an instruction to launch a program, the memory device 203 reads the program from the auxiliary storage device 202 and stores the program.

The CPU 204 runs various programs stored in the memory device 203 to implement various functions of the server 200 in accordance with the programs.

The interface device 205 is used as an interface for connecting with an external communication line. With this configuration, the server 200 is able to communicate with, for example, the vehicle 100, the user terminal 300, or an outside facility, such as a police station PS, through the predetermined communication line.

The display device 206, for example, displays graphical user interface (GUI) in accordance with a program that the CPU 204 runs.

The input device 207 is used to allow an operator, an administrator, or the like, of the server 200 to input various operation instructions on the server 200.

Figure 12:
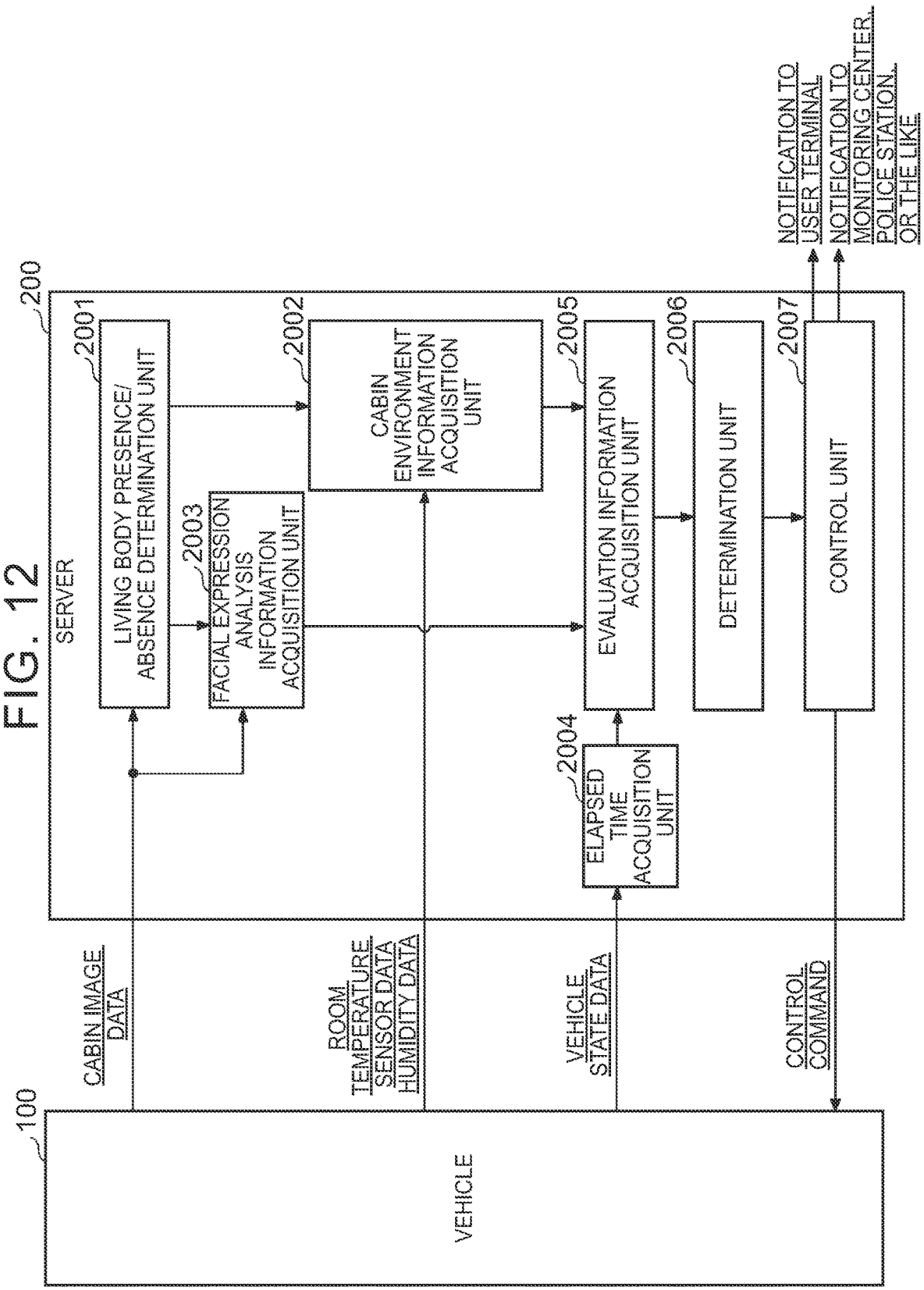
FIG. 12 is a functional block diagram showing an example of the functional configuration of the server.

As shown in FIG. 12, the server 200 includes a living body presence/absence determination unit 2001, a cabin environment information acquisition unit 2002, a facial expression analysis information acquisition unit 2003, an elapsed time acquisition unit 2004, an evaluation information acquisition unit 2005, a determination unit 2006, and a control unit 2007 as functional units. The functional units of the server 200 are, for example, implemented by loading various programs installed in the auxiliary storage device 202 onto the memory device 203 and running the programs on the CPU 204.

The living body presence/absence determination unit 2001 (an example of the first determination unit) determines whether there is a monitored living body in the cabin of the vehicle 100 based on image data taken by the cabin camera 10, received from the vehicle 100, when the vehicle 100 is in a parked state. A specific determination method may be similar to that in the case of the first example (living body presence/absence determination unit 801).

The cabin environment information acquisition unit 2002 acquires information on a cabin environment of the vehicle 100 based on output data of the cabin camera 10, the room temperature sensor 20, the humidity sensor 30, and the like, received from the vehicle 100, when the vehicle 100 is in a parked state. A specific acquisition method for cabin environment information by the cabin environment information acquisition unit 2002 and the specific details of cabin environment information to be acquired may be similar to those in the case of the first and other examples (cabin environment information acquisition unit 802).

When the living body presence/absence determination unit 2001 determines that there is a monitored living body in the cabin of the vehicle 100, the facial expression analysis information acquisition unit 2003 (an example of the facial expression information acquisition unit) performs known facial expression analysis on the face of the monitored living body contained in image data taken by the cabin camera 10 based on the image data. The facial expression analysis information acquisition unit 2003 acquires facial expression analysis information based on the result of facial expression analysis. The specific details of facial expression analysis to be acquired by the facial expression analysis information acquisition unit 2003 may be similar to those in the case of the first and other examples (facial expression analysis information acquisition unit 803).

The facial expression analysis information acquisition unit 2003 may, for example, make a request of an external device, such as the facial expression analysis server 400 in the second example, for image analysis.

The elapsed time acquisition unit 2004 acquires a left-behind elapsed time based on output data of the vehicle state data output device 40, received from the vehicle 100. A specific acquisition method for a left-behind elapsed time to be acquired by the elapsed time acquisition unit 2004 may be similar to those in the case of the first and other examples (elapsed time acquisition unit 804).

When the living body presence/absence determination unit 2001 determines that there is a living body in the cabin of the vehicle 100, the evaluation information acquisition unit 2005 (an example of the estimation unit) estimates a degree of decrease in the safety of the life of the monitored living body in the vehicle 100. Specifically, in a situation in which a monitored living body is left in the cabin of the vehicle 100, the evaluation information acquisition unit 2005 acquires an evaluation index EI on a degree of decrease in the safety of the life of the monitored living body in the vehicle 100 based on cabin environment information, facial expression analysis information, and a left-behind elapsed time at predetermined control intervals. A specific acquisition method for an evaluation index EI to be acquired by the evaluation information acquisition unit 2005 and the specific details of the evaluation index EI to be acquired may be similar to those in the case of the first and other examples (evaluation information acquisition unit 805).

The determination unit 2006 (an example of the second determination unit) determines whether the safety of the life of a monitored living body is lower than or equal to a predetermined reference based on evaluation information sequentially acquired by the evaluation information acquisition unit 2005 in a situation in which the monitored living body is left in the cabin of the vehicle 100. A specific determination method may be similar to those in the case of the first and other examples (determination unit 806).

When the determination unit 2006 determines that the safety of the life of the monitored living body left in the cabin of the vehicle 100 is lower than or equal to the predetermined reference, the control unit 2007 activates the safety function.

The control unit 2007 may, for example, activate the vehicle surrounding alarm function or the air conditioner operating function by transmitting a control command to the vehicle 100.

The control unit 2007 may, for example, activate the user alarm function by transmitting an alarm signal to the user terminal 300.

The control unit 2007 may, for example, implement the operator notification function by causing the display device 206 visually recognizable by an operator OP or the like to display alarm information on a monitored living body left in the cabin of the vehicle 100.

The control unit 2007 may, for example, activate the police station notification function by communicating (automatic voice call or the like) with a police station PS through the predetermined communication line to provide a notification about a monitored living body left in the cabin of the vehicle 100.

The server 200 executes a living body left-behind monitoring process (FIG. 7) similar to those in the case of the first and other examples. In this case, a subject that executes the process of FIG. 7 is replaced with the living body presence/absence determination unit 2001, the cabin environment information acquisition unit 2002, the facial expression analysis information acquisition unit 2003, the elapsed time acquisition unit 2004, the evaluation information acquisition unit 2005, the determination unit 2006, and the control unit 2007.

In this way, in this example, the server 200 monitors a degree of decrease in the safety of the life of a monitored living body left in the cabin from outside the vehicle 100 by using monitoring data uploaded from the vehicle 100. When the safety of the life of a monitored living body left in the cabin of the vehicle 100 is lower than or equal to a predetermined reference, the server 200 activates the safety function to ensure the safety of the life of the monitored living body. With this configuration, the living body left-behind monitoring system 1 is able to reduce a processing load at the vehicle 100 (edge) side and to reduce dead battery due to an increase in electric power consumption when the vehicle 100 is in a parked state.

Operation

Next, the operation of the living body left-behind monitoring system 1 (the control apparatus 80 or the server 200) according to the present embodiment will be described.

In the present embodiment, the control apparatus 80 includes the living body presence/absence determination unit 801, the facial expression analysis information acquisition unit 803, the determination unit 806, and the control unit 807. Specifically, the living body presence/absence determination unit 801 determines whether a monitored living body is left in the cabin of the vehicle 100. The facial expression analysis information acquisition unit 803 acquires information on the facial expression of the face of the monitored living body based on image data taken by the cabin camera 10, including the face of the monitored living body left in the cabin of the vehicle 100. The determination unit 806 determines whether the safety of the life of the monitored living body is lower than or equal to a predetermined reference based on the information on the facial expression of the monitored living body. When the determination unit 806 determines that the safety of the life of the monitored living body is lower than or equal to the predetermined reference, the control unit 807 activates a safety function for ensuring the safety of the life of the monitored living body.

Similarly, the server 200 includes the living body presence/absence determination unit 2001, the facial expression analysis information acquisition unit 2003, the determination unit 2006, and the control unit 2007. Specifically, the living body presence/absence determination unit 2001 determines whether a monitored living body is left in the cabin of the vehicle 100. The facial expression analysis information acquisition unit 2003 acquires information on the facial expression of the face of the monitored living body based on image data taken by the cabin camera 10, including the face of the monitored living body left in the cabin of the vehicle 100. The determination unit 2006 determines whether the safety of the life of the monitored living body is lower than or equal to a predetermined reference based on the information on the facial expression of the monitored living body. When the determination unit 2006 determines that the safety of the life of the monitored living body is lower than or equal to the predetermined reference, the control unit 2007 activates a safety function for ensuring the safety of the life of the monitored living body.

With this configuration, the control apparatus 80 or the server 200 (hereinafter, the control apparatus 80 or the like) is able to use information on the facial expression of the face of a monitored living body left in the cabin of the vehicle 100. Therefore, the control apparatus 80 or the like is able to grasp a state or the like specific to the monitored living body based on the facial expression of the face of the monitored living body and determine a degree of decrease in the safety of the life of the monitored living body. Thus, the control apparatus 80 or the like is able to ensure the safety of the life of the living body left in the vehicle 100 in consideration of an individual difference of the monitored living body.

In the present embodiment, the control apparatus 80 may include the evaluation information acquisition unit 805. Specifically, the evaluation information acquisition unit 805 may estimate a degree of decrease in the safety of the life of a monitored living body based on information on the facial expression of the monitored living body, acquired by the facial expression analysis information acquisition unit 803.

The determination unit 806 determines whether the safety of the life of the monitored living body is lower than or equal to a predetermined reference based on the estimated result of the evaluation information acquisition unit 805.

Similarly, the server 200 may include the evaluation information acquisition unit 2005. Specifically, the evaluation information acquisition unit 2005 may estimate a degree of decrease in the safety of the life of a monitored living body based on information on the facial expression of the monitored living body, acquired by the facial expression analysis information acquisition unit 2003. The determination unit 2006 determines whether the safety of the life of the monitored living body is lower than or equal to a predetermined reference based on the estimated result of the evaluation information acquisition unit 2005.

With this configuration, the control apparatus 80 or the like is able to estimate a degree of decrease in the safety of the life of a monitored living body left in the cabin of the vehicle 100 in consideration of an individual difference of the monitored living body by using information on the facial expression of the face of the monitored living body. Therefore, when the control apparatus 80 or the like determines whether the safety of the life of the monitored living body is lower than or equal to the predetermined reference by using the estimated result, the control apparatus 80 or the like is able to ensure the safety of the life of the monitored living body left in the vehicle 100, specifically, in consideration of an individual difference of the monitored living body.

The determination unit 806 or the determination unit 2006 may determine whether the safety of the life of a monitored living body is lower than or equal to a predetermined reference by directly using cabin environment information, facial expression analysis information, a left-behind elapsed time, and the like, instead of evaluation information (evaluation index EI). In this case, the evaluation information acquisition unit 805 or the evaluation information acquisition unit 2005 may be omitted. For example, the determination unit 806 or the determination unit 2006 may determine whether the safety of the life of a monitored living body is lower than or equal to a predetermined reference by determining whether conditions respectively defined for cabin environment information, facial expression analysis information, an elapsed time, and the like, are satisfied.

In the present embodiment, information on the facial expression of a monitored living body may include information on the emotion of the monitored living body. The evaluation information acquisition unit 805 may estimate a degree of decrease in the safety of the life of a monitored living body such that a degree of decrease in the safety of the life of the monitored living body when the information on the emotion of the monitored living body represents a negative emotion is greater than a degree of decrease in the safety of the life of the monitored living body when the information on the emotion of the monitored living body represents a positive emotion or a neutral emotion.

Similarly, the evaluation information acquisition unit 2005 may estimate a degree of decrease in the safety of the life of a monitored living body such that a degree of decrease in the safety of the life of the monitored living body when the information on the emotion of the monitored living body represents a negative emotion is greater than a degree of decrease in the safety of the life of the monitored living body when the information on the emotion of the monitored living body represents a positive emotion or a neutral emotion.

With this configuration, the control apparatus 80 or the like is able to estimate a degree of decrease in the safety of the life of a monitored living body left in the vehicle 100, specifically, in consideration of an individual difference of the monitored living body by capturing the emotion of the monitored living body.

In the present embodiment, information on the facial expression of a monitored living body may include information on the face state of the monitored living body. The evaluation information acquisition unit 805 may estimate a degree of decrease in the safety of the life of a monitored living body such that a degree of decrease in the safety of the life of the monitored living body when the information on the face state of the monitored living body represents a negative face state is greater than a degree of decrease in the safety of the life of the monitored living body when the information on the face state of the monitored living body represents a positive face state or a neutral face state.

Similarly, the evaluation information acquisition unit 2005 may estimate a degree of decrease in the safety of the life of a monitored living body such that a degree of decrease in the safety of the life of the monitored living body when the information on the face state of the monitored living body represents a negative face state is greater than a degree of decrease in the safety of the life of the monitored living body when the information on the face state of the monitored living body represents a positive face state or a neutral face state.

With this configuration, the control apparatus 80 or the like is able to estimate a degree of decrease in the safety of the life of a monitored living body left in the vehicle 100, specifically, in consideration of an individual difference of the monitored living body by capturing the face state of the monitored living body.

In the present embodiment, the evaluation information acquisition unit 805 may estimate a degree of decrease in the safety of the life of a monitored living body such that a decrease in the safety of the life of the monitored living body accelerates as the information on the emotion of the monitored living body changes from a state representing a positive emotion or a neutral emotion to a state representing a negative emotion or as the information on the face state of the monitored living body changes from a state representing a positive face state or a neutral face state to a state representing a negative face state.

Similarly, the evaluation information acquisition unit 2005 may estimate a degree of decrease in the safety of the life of a monitored living body such that a decrease in the safety of the life of the monitored living body accelerates as the information on the emotion of the monitored living body changes from a state representing a positive emotion or a neutral emotion to a state representing a negative emotion or as the information on the face state of the monitored living body changes from a state representing a positive face state or a neutral face state to a state representing a negative face state.

With this configuration, the control apparatus 80 or the like is able to estimate a degree of decrease in the safety of the life of a monitored living body by capturing a situation in which a decrease in the safety of the life of the monitored living body is accelerating with a negative change of the emotion or face state of the monitored living body. Therefore, the control apparatus 80 or the like is able to estimate a degree of decrease in the safety of the life of the monitored living body, specifically, in consideration of an individual difference of the monitored living body by capturing a negative change of the emotion or face state of the monitored living body.

In the present embodiment, the evaluation information acquisition unit 805 estimates a degree of decrease in the safety of the life of a monitored living body such that the safety of the life of the monitored living body decreases with a lapse of time for which the monitored living body has been left in the cabin of the vehicle 100. The evaluation information acquisition unit 805 estimates a degree of decrease in the safety of the monitored living body such that a rate of decrease in the safety of the life of the monitored living body to the lapse of time when the information on the emotion of the monitored living body represents a negative emotion is higher than a rate of decrease in the safety of the life of the monitored living body to the lapse of time when the information on the emotion of the monitored living body represents a positive emotion or a neutral emotion and a rate of decrease in the safety of the life of the monitored living body to the lapse of time when the information on the face state of the monitored living body represents a negative face state is higher than a rate of decrease in the safety of the life of the monitored living body to the lapse of time when the information on the face state of the monitored living body represents a positive face state or a neutral face state.

Similarly, the evaluation information acquisition unit 2005 estimates a degree of decrease in the safety of the life of a monitored living body such that the safety of the life of the monitored living body decreases with a lapse of time for which the monitored living body has been left in the cabin of the vehicle 100. The evaluation information acquisition unit 805 estimates a degree of decrease in the safety of the monitored living body such that a rate of decrease in the safety of the life of the monitored living body to the lapse of time when the information on the emotion of the monitored living body represents a negative emotion is higher than a rate of decrease in the safety of the life of the monitored living body to the lapse of time when the information on the emotion of the monitored living body represents a positive emotion or a neutral emotion and a rate of decrease in the safety of the life of the monitored living body to the lapse of time when the information on the face state of the monitored living body represents a negative face state is higher than a rate of decrease in the safety of the life of the monitored living body to the lapse of time when the information on the face state of the monitored living body represents a positive face state or a neutral face state.

With this configuration, the control apparatus 80 or the like is able to variably change a rate of decrease in the safety of the life of a monitored living body depending on a difference in the emotion or the face state of the monitored living body on the assumption that the safety of the life of the monitored living body decreases with a lapse of time for which the monitored living body has been left in the cabin of the vehicle 100. Therefore, the control apparatus 80 or the like is able to estimate a degree of decrease in the safety of the life of the monitored living body, specifically, such that a decrease in the safety of the life of the monitored living body accelerates with a negative change of the emotion or face state of the monitored living body.

In the present embodiment, information on the facial expression of a monitored living body may include information on the emotion of the monitored living body. The evaluation information acquisition unit 805 may estimate a degree of decrease in the safety of the life of the monitored living body such that, when the information on the emotion of the monitored living body represents any one of multiple types of negative emotions defined in advance, a degree of decrease in the safety of the life of the monitored living body varies depending on the represented one of the types of negative emotions.

Similarly, the evaluation information acquisition unit 2005 may estimate a degree of decrease in the safety of the life of the monitored living body such that, when the information on the emotion of the monitored living body represents any one of multiple types of negative emotions defined in advance, a degree of decrease in the safety of the life of the monitored living body varies depending on the represented one of the types of negative emotions.

With this configuration, the control apparatus 80 or the like is able to further appropriately estimate a degree of decrease in the safety of the life of a monitored living body even when a physical condition or the like of the monitored living body, expressed by the emotion, can vary depending on the type of a negative emotion.

In the present embodiment, information on the facial expression of a monitored living body may include information on the age of the monitored living body. The evaluation information acquisition unit 805 may estimate a degree of decrease in the safety of the life of the monitored living body such that a degree of decrease in the safety of the life of the monitored living body varies depending on the age of the monitored living body.

Similarly, the evaluation information acquisition unit 2005 may estimate a degree of decrease in the safety of the life of the monitored living body such that a degree of decrease in the safety of the life of the monitored living body varies depending on the age of the monitored living body.

With this configuration, the control apparatus 80 or the like is able to further appropriately estimate a degree of decrease in the safety of the life of a monitored living body when a characteristic, such as physical fitness, can vary depending on the age of the monitored living body.

In the present embodiment, the safety function for ensuring the safety of the life of a monitored living body may include at least one of a function of issuing an alarm about a monitored living body left behind to around the vehicle 100 through the sound output device 60 mounted on the vehicle 100, a function of providing a notification about a monitored living body left behind to the user terminal 300 used by a user of the vehicle 100, a function of providing a notification about a monitored living body left behind to a predetermined facility provided outside the vehicle 100, and a function of activating the air conditioner of the vehicle 100.

With this configuration, the control apparatus 80 or the like is able to specifically ensure the safety of the life of a monitored living body.

The embodiment is described in detail; however, the disclosure is not limited to the specific embodiment. Various modifications or improvements are applicable within the scope of the purport described in the appended claims.

What is claimed is:

1. An information processing apparatus comprising:
a first determination unit configured to determine whether a predetermined living body is left in a cabin of a vehicle;
a facial expression information acquisition unit configured to acquire information on facial expression of the predetermined living body based on image data containing a face of the predetermined living body left in the cabin of the vehicle, the information on the facial expression of the predetermined living body including information on emotion of the predetermined living body and information on a face state of the predetermined living body;
an estimation unit configured to estimate a degree of decrease in a safety of a life of the predetermined living body,
(i) such that a degree of decrease in the safety of the life of the predetermined living body when the information on the emotion of the predetermined living body represents a negative emotion is greater than a degree of decrease in the safety of the life of the predetermined living body when the information on the emotion of the predetermined living body represents a positive emotion or a neutral emotion, and
(ii) such that a degree of decrease in the safety of the life of the predetermined living body when the information on the face state of the predetermined living body represents a negative face state is greater than a degree of decrease in the safety of the life of the predetermined living body when the information on the face state of the predetermined living body represents a positive face state or neutral face state of the predetermined living body, and
a second determination unit configured to determine whether the safety of the life of the predetermined living body is lower than or equal to a predetermined reference in accordance with an estimated result of the estimation unit; and
a control unit configured to, when the second determination unit determines that the safety of the life of the predetermined living body is lower than or equal to the predetermined reference, activate a safety function for ensuring the safety of the life of the predetermined living body.

2. The information processing apparatus according to claim 1, wherein the estimation unit is configured to estimate the degree of decrease in the safety of the life of the predetermined living body such that a decrease in the safety of the life of the predetermined living body accelerates as the information on the emotion of the predetermined living body changes from a state representing the positive emotion or the neutral emotion to a state representing the negative emotion or as the information on the face state of the predetermined living body changes from a state representing the positive face state or the neutral face state to a state representing the negative face state.

3. The information processing apparatus according to claim 2, wherein:
the estimation unit is configured to estimate the degree of decrease in the safety of the life of the predetermined living body such that the safety of the life of the predetermined living body decreases with a lapse of time for which the predetermined living body has been left in the cabin of the vehicle; and
the estimation unit is configured to estimate the degree of decrease in the safety of the life of the predetermined living body such that a rate of decrease in the safety of the life of the predetermined living body to the lapse of time when the information on the emotion of the predetermined living body represents the negative emotion is higher than a rate of decrease in the safety of the life of the predetermined living body to the lapse of time when the information on the emotion of the predetermined living body represents the positive emotion or the neutral emotion and a rate of decrease in the safety of the life of the predetermined living body to the lapse of time when the information on the face state of the predetermined living body represents the negative face state is higher than a rate of decrease in the safety of the life of the predetermined living body to the lapse of time when the information on the face state of the predetermined living body represents the positive face state or the neutral face state.

4. The information processing apparatus according to claim 1, wherein the estimation unit is configured to estimate the degree of decrease in the safety of the life of the predetermined living body such that, when the information on the emotion of the predetermined living body represents any one of multiple types of negative emotions defined in advance, the degree of decrease in the safety of the life of the predetermined living body varies depending on the represented one of the types of negative emotions.

5. The information processing apparatus according to claim 2, wherein:
the information on the facial expression of the predetermined living body includes information on age of the predetermined living body; and
the estimation unit is configured to estimate the degree of decrease in the safety of the life of the predetermined living body such that the degree of decrease in the safety of the life of the predetermined living body varies depending on the age of the predetermined living body.

6. The information processing apparatus according to claim 1, wherein the safety function for ensuring the safety of the life of the predetermined living body includes at least one of
a function of issuing an alarm about the predetermined living body left behind to around the vehicle through a sound output device mounted on the vehicle,
a function of providing a notification about the predetermined living body left behind to a terminal device used by a user of the vehicle,
a function of providing a notification about the predetermined living body left behind to a predetermined facility provided outside the vehicle, and
a function of activating an air conditioner of the vehicle.

7. An information processing method that is executed by an information processing apparatus, the information processing method comprising:
determining whether a predetermined living body is left in a cabin of a vehicle;
acquiring information on facial expression of the predetermined living body based on image data containing a face of the predetermined living body left in the cabin of the vehicle, the information on the facial expression of the face of the predetermined living body including information on emotion of the predetermined living body and information on a face state of the predetermined living body;
estimating a degree of decrease in a safety of a life of the predetermined living body,
(i) such that a degree of decrease in the safety of the life of the predetermined living body when the information on the emotion of the predetermined living body represents a negative emotion is greater than a degree of decrease in the safety of the life of the predetermined living body when the information on the emotion of the predetermined living body represents a positive emotion or a neutral emotion, and
(ii) such that a degree of decrease in the safety of the life of the predetermined living body when the information on the face state of the predetermined living body represents a negative face state is greater than a degree of decrease in the safety of the life of the predetermined living body when the information on the face state of the predetermined living body represents a positive face state or neutral face state of the predetermined living body;
determining whether the safety of the life of the predetermined living body is lower than or equal to a predetermined reference in accordance with the estimated degree of decrease in the safety of the life of the predetermined living body; and
when it is determined that the safety of the life of the predetermined living body is lower than or equal to the predetermined reference, activating a safety function for ensuring the safety of the life of the predetermined living body.

8. A non-transitory storage medium storing instructions that are executable by one or more processors and that cause the one or more processors to perform functions comprising:
determining whether a predetermined living body is left in a cabin of a vehicle;
acquiring information on facial expression of the predetermined living body based on image data containing a face of the predetermined living body left in the cabin of the vehicle, the information on the facial expression of the face of the predetermined living body including information on emotion of the predetermined living body and information on a face state of the predetermined living body;
estimating a degree of decrease in a safety of a life of the predetermined living body,
(i) such that a degree of decrease in the safety of the life of the predetermined living body when the information on the emotion of the predetermined living body represents a negative emotion is greater than a degree of decrease in the safety of the life of the predetermined living body when the information on the emotion of the predetermined living body represents a positive emotion or a neutral emotion, and
(ii) such that a degree of decrease in the safety of the life of the predetermined living body when the information on the face state of the predetermined living body represents a negative face state is greater than a degree of decrease in the safety of the life of the predetermined living body when the information on the face state of the predetermined living body represents a positive face state or neutral face state of the predetermined living body;
determining whether the safety of the life of the predetermined living body is lower than or equal to a predetermined reference in accordance with the estimated degree of decrease in the safety of the life of the predetermined living body; and
when it is determined that the safety of the life of the predetermined living body is lower than or equal to the predetermined reference, activating a safety function for ensuring the safety of the life of the predetermined living body.

* * * * *